United States Patent
Tang et al.

(10) Patent No.: US 9,738,986 B2
(45) Date of Patent: Aug. 22, 2017

(54) METHOD OF MANUFACTURING LAYERED METAL OXIDE PARTICLES AND LAYERED METAL OXIDE PARTICLES FORMED THEREOF

(75) Inventors: Yuxin Tang, Singapore (SG); Zhili Dong, Singapore (SG); Zhong Chen, Singapore (SG)

(73) Assignee: Nanyang Technological University, Singapore (SG)

( * ) Notice: Subject to any disclaimer, the term of this patent is extended or adjusted under 35 U.S.C. 154(b) by 922 days.

(21) Appl. No.: 13/583,588

(22) PCT Filed: Mar. 8, 2011

(86) PCT No.: PCT/SG2011/000091
§ 371 (c)(1),
(2), (4) Date: Nov. 19, 2012

(87) PCT Pub. No.: WO2011/112153
PCT Pub. Date: Sep. 15, 2011

(65) Prior Publication Data
US 2013/0092545 A1    Apr. 18, 2013

Related U.S. Application Data

(60) Provisional application No. 61/311,499, filed on Mar. 8, 2010.

(51) Int. Cl.
C25D 11/02    (2006.01)
C25B 1/00     (2006.01)
(Continued)

(52) U.S. Cl.
CPC ............... C25D 15/00 (2013.01); C25B 1/00 (2013.01); C25D 11/026 (2013.01); C25D 11/26 (2013.01); B82Y 40/00 (2013.01)

(58) Field of Classification Search
CPC ......... C25B 1/00; C25D 11/026; C25D 11/26; C25D 15/00; B82Y 40/00
See application file for complete search history.

(56) References Cited

U.S. PATENT DOCUMENTS 6,676,821 B1    1/2004  Hempelmann et al.
2005/0103639 A1  5/2005  Lu et al.

OTHER PUBLICATIONS

Zhu et al. Phase Transition between Nanostructures of Titanate and Titanium Dioxides via Simple Wet-Chemical Reactions. JACS Articles. Apr. 15, 2005.*

(Continued)

Primary Examiner — Ciel Thomas
(74) Attorney, Agent, or Firm — Seed IP Law Group LLP

(57) ABSTRACT

The present invention refers to a method of manufacturing layered metal oxide particles, the method comprising: placing a metal electrode in an electrolyte; and applying an electrical voltage to the electrode, wherein the metal electrode forms the anode, to form a metal oxide layer on the electrode surface, wherein the electrical voltage applied is higher than the breakdown voltage of the metal oxide, thereby breaking down the metal oxide layer formed on the electrode surface into metal oxide particles that react with the electrolyte to form the layered metal oxide particles. The present invention also refers to a layered metal oxide particle obtained from the method, and a method of manufacturing a crystalline metal oxide nanosheet or a crystalline metal oxide nanoribbon.

20 Claims, 14 Drawing Sheets

(51) Int. Cl.
    C25D 11/26       (2006.01)
    C25D 15/00       (2006.01)
    B82Y 40/00       (2011.01)

(56)         References Cited

OTHER PUBLICATIONS

Bavykin et al., "Protonated Titanates and $TiO_2$ Nanostructured Materials: Synthesis, Properties, and Applications," *Advanced Materials* 18:2807-2824, 2006.
Chen et al., "Trititanate Nanotubes Made via a Single Alkali Treatment," *Advanced Materials* 14(17):1208-1211, Sep. 3, 2002.
Choy et al., "A novel synthetic route to $TiO_2$-pillared layered titanate with enhanced photocatalytic activity," *Journal of Materials Chemistry* 11:2232-2234, 2001.
Dai et al., "Hierarchical nanostructures of K-birnessite nanoplates on anatase nanofibers and their application for decoloration of dye solution," *Journal of Materials Chemistry* 20:3157-3162, 2010.
Doong et al., "Fabrication and Characterization of Nanostructured Titanate Materials by the Hydrothermal Treatment Method," *Recent Patents on Nanotechnology* 2(2):84-102, 2008.
Entezari et al., "Sono-sorption as a new method for the removal of lead ion from aqueous solution," *Journal of Hazardous Materials B* 137:959-964, 2006.
Gao et al., "Crystal Structures of Titanate Nanotubes: A Raman Scattering Study," *Inorganic Chemistry* 48(4):1423-1432, 2009.
Gao et al., "Raman Scattering Properties of a Protonic Titanate $H_xTi_{2-x/4}\square_{x/4}O_4 \cdot H_2O$ ($\square$, vacancy; x=0.7) with Lepidocrocite-Type Layered Structure," *Journal of Physical Chemistry B* 112(31):9400-9405, 2008.
Ghicov et al., "Self-ordering electrochemistry: a review on growth and functionality of $TiO_2$ nanotubes and other self-aligned $MO_x$ structures," *Chemical Communications*:2791-2808, 2009.
Gu et al., "An Aqueous Emulsion Route to Synthesize Mesoporous Carbon Vesicles and Their Nanocomposites," *Advanced Materials* 22:833-837, 2010.
Guo et al., "Structure-tunable synthesis of titanate nanotube thin films via a simple hydrothermal process," *Nanotechnology* 18:295608, 2007, 8 pages.
Hahn et al., "Efficient solar energy conversion using $TiO_2$ nanotubes produced by rapid breakdown anodization—a comparison," *physica status solidi—Rapid Research Letters* 1(4):135-137, 2007.
Han et al., "Structure and in vitro bioactivity of titania-based films by micro-arc oxidation," *Surface & Coatings Technology* 168:249-258, 2003.
Ho et al., "Synthesis of hierarchical nanoporous F-doped $TiO_2$ spheres with visible light photocatalytic activity," *Chemical Communications*:1115-1117, 2006.
Hu et al., "Synthesis of Hierarchically Structured Metal Oxides and their Application in Heavy Metal Ion Removal," *Advanced Materials* 20:2977-2982, 2008.
Huang et al., "Facile Synthesis of Titanate Nanoflowers by a Hydrothermal Route," *Crystal Growth & Design* 8(7):2444-2446, 2008.
Huang et al., "Rapid and Effective Adsorption of Lead Ions on Fine Poly(phenylenediamine) Microparticles," *Chemistry—A European Journal* 12:4341-4350, 2006.
Jitputti et al., "Low temperature hydrothermal synthesis of monodispersed flower-like titanate nanosheets," *Catalysis Communications* 10:378-382, 2009.
Ju et al., "Novel heavy-metal adsorption material: ion-recognition P(NIPAM-co-BCAm) hydrogels for removal of lead(II) ions," *Journal of Hazardous Materials* 167:114-118, 2009.
Kasuga et al., "Formation of Titanium Oxide Nanotube," *Langmuir* 14(12):3160-3163, 1998.
Kasuga et al., "Titania Nanotubes Prepared by Chemical Processing," *Advanced Materials* 11(15):1307-1311, 1999.
Kim et al., "Effect of heat treatment on apatite-forming ability of Ti metal induced by alkali treatment," *Journal of Materials Science: Materials in Medicine* 8:341-347, 1997.
Kim et al., "Heterostructured Visible-Light-Active Photocatalyst of Chromia-Nanoparticle-Layered Titanate," *Advanced Functional Materials* 17:307-314, 2007.
Kochkar et al., "Study of Pd(II) adsorption over titanate nanotubes of different diameters,", *Journal of Colloid and Interface Science* 331:27-31, 2009.
Lai et al., "Designing Superhydrophobic Porous Nanostructures with Tunable Water Adhesion," *Advanced Materials* 21:3799-3803, 2009.
Lai et al., "Electrophoretic deposition of titanate nanotube films with extremely large wetting contrast," *Electrochemistry Communications* 11:2268-2271, 2009.
Lai et al., "Markedly Controllable Adhesion of Superhydrophobic Spongelike Nanostructure $TiO_2$ Films," *Langmuir* 24(8):3867-3873, 2008.
Lee et al., "Effects of synthesis temperature on the microstructures and basic dyes adsorption of titanate nanotubes," *Journal of Hazardous Materials* 150:494-503, 2008.
Li et al., "Hexagonal-Close-Packed, Hierarchical Amorphous $TiO_2$ Nanocolumn Arrays: Transferability, Enhanced Photocatalytic Activity, and Superamphiphilicity without UV Irradiation," *Journal of the American Chemical Society* 130:14755-14762, 2008.
Li et al., "Improved biological performance of Ti implants due to surface modification by micro-arc oxidation," *Biomaterials* 25:2867-2875, 2004.
Liu et al., "Band-to-Band Visible-Light Photon Excitation and Photoactivity Induced by Homogenous Nitrogen Doping in Layered Titanates," *Chemistry of Materials* 21(7):1266-1274, 2009.
Liu et al., "Highly ordered mesoporous carbon nanofiber arrays from a crab shell biological template and its applications in supercapacitors and fuel cells," *Journal of Materials Chemistry* 20:4223-4230, 2010.
Liu et al., "Synthesis of Titanate Nanorods by High-Temperature Oxidation," *Journal of Physical Chemistry C* 112(12):4545-4549, 2008.
Ma et al., "Nanotubes of lepidocrocite titanates," *Chemical Physics Letters* 380:577-582, 2003.
Mao et al., "Synthesis and Growth Mechanism of Titanate and Titania One-Dimensional Nanostructures Self-Assembled into Hollow Micrometer-Scale Spherical Aggregates," *Journal of Physical Chemistry B* 110(2):702-710, 2006.
Miyamoto et al., "Exfoliation and film preparation of a layered titanate, $Na_2Ti_3O_7$, and intercalation of pseudoisocyanine dye," *Journal of Materials Chemistry* 14:165-170, 2004.
Miyamoto et al., "Formation of extraordinarily large nanosheets from $K_4Nb_6O_{17}$ crystals," *Chemical Communications*:2378-2379, 2002.
Mor et al., "A review on highly ordered, vertically oriented $TiO_2$ nanotube arrays: Fabrication, material properties, and solar energy applications," *Solar Energy Materials & Solar Cells* 90:2011-2075, 2006.
Niu et al., "Adsorption behavior of arsenic onto protonated titanate nanotubes prepared via hydrothermal method," *Microporous and Mesoporous Materials* 122:28-35, 2009.
Ou et al., "Review of titania nanotubes synthesized via the hydrothermal treatment: Fabrication, modification, and application," *Separation and Purification Technology* 58:179-191, 2007.
Oubagaranadin et al., "Adsorption of Divalent Lead on a Montmorillonite—Illite Type of Clay," *Industrial & Engineering Chemistry Research* 48(23):10627-10636, 2009.
Peng et al., "(101)-Exposed Anatase $TiO_2$ Nanosheets," *Chemistry of Materials* 20(7):2426-2428, 2008.
Perić et al., "Removal of zinc, copper and lead by natural zeolite—a comparison of adsorption isotherms," *Water Research* 38:1893-1899, 2004.
Riss et al., "Stability and Photoelectronic Properties of Layered Titanate Nanostructures," *Journal of the American Chemical Society* 131:6198-6206, 2009.

(56) References Cited

OTHER PUBLICATIONS

Sasaki et al., "Osmotic Swelling to Exfoliation. Exceptionally High Degrees of Hydration of a Layered Titanate," *Journal of the American Chemical Society* 120(19):4682-4689, 1998.

Sasaki et al., "Two-Dimensional Diffraction of Molecular Nanosheet Crystallites of Titanium Oxide," *Journal of Physical Chemistry B* 105(26):6116-6121, 2001.

Shankar et al., "Recent Advanced in the Use of $TiO_2$ Nanotube and Nanowire Arrays for Oxidative Photoelectrochemistry," *Journal of Physical Chemistry C* 113(16):6327-6359, 2009.

Singh et al., "Studies on the removal of Pb(II) from wastewater by activated carbon developed from Tamarind wood activated with sulphuric acid," *Journal of Hazardous Materials* 153:221-228, 2008.

Sreejalekshmi et al., "Adsorption of Pb(II) and Pb(II)-citric acid on sawdust activated carbon: Kinetic and equilibrium isotherm studies," *Journal of Hazardous Materials* 161:1506-1513, 2009.

Sun et al., "Controlled Growth of $SnO_2$ Hierarchical Nanostructures by a Multistep Thermal Vapor Deposition Process," *Chemistry —A European Journal* 13:9087-9092, 2007.

Sun et al., "Synthesis and Characterization of Ion-Exchangeable Titanate Nanotubes," *Chemistry—A European Journal* 9:2229-2238, 2003.

Suzuki et al., "Synthesis and thermal analyses of $TiO_2$-derived nanotubes prepared by the hydrothermal method," *Journal of Materials Research* 19(4):982-985, Apr. 2004.

Takezawa et al., "Bottom-Up Synthesis of Titanate Nanosheets with Hierarchical Structures and a High Specific Surface Area," *Small* 2(3):390-393, 2006.

Tang et al., "Ultrafast Synthesis of Layered Titanate Microspherulite Particles by Electrochemical Spark Discharge Spallation," *Chemistry—A European Journal* 16:7704-7708, 2010.

Tsai et al., "Regulation of the Physical Characteristics of Titania Nanotube Aggregates Synthesized from Hydrothermal Treatment," *Chemistry of Materials* 16(22):4352-4358, 2004.

Tsai et al., "Structural Features of Nanotubes Synthesized from NaOH Treatment on $TiO_2$ with Different Post-Treatments," *Chemistry of Materials* 18(2):367-373, 2006.

Vermilyea, "The Kinetics of Formation and Structure of Anodic Oxide Films on Tantalum," *Acta Metallurgica* 1:282-294, May 1953.

Wei et al., "High rate performances of hydrogen titanate nanowires electrodes," *Electrochemistry Communications* 10:1164-1167, 2008.

Wu et al., "Large-Scale Synthesis of Titanate and Anatase Tubular Hierarchitectures," *Small* 3(9):1518-1522, 2007.

Wu et al., "Preparation of photocatalytic anatase nanowire films by in situ oxidation of titanium plate," *Nanotechnology* 20:185703, 2009, 8 pages.

Xu et al., "Synthesis and Characterization of Single-Crystalline Alkali Titanate Nanowires," *Journal of the American Chemical Society* 127(33):11584-11585, 2005.

Xue et al., "Hierarchically Porous Silica with Ordered Mesostructure from Confinement Self-Assembly in Skeleton Scaffolds," *Chemistry of Materials* 22(2):494-503, 2010.

Yang et al., "Layered Titanate Nanofibers as Efficient Adsorbents for Removal of Toxic Radioactive and Heavy Metal Ions from Water," *Journal of Physical Chemistry C* 112(42):16275-16280, 2008.

Yang et al., "Titanate Nanofibers as Intelligent Absorbents for the Removal of Radioactive Ions from Water," *Advanced Materials* 20:2777-2781, 2008.

Yerokhin et al., "Plasma electrolysis for surface engineering," *Surface & Coatings Technology* 122:73-93, 1999.

Yoshida et al., "Effects of synthetic conditions and heat-treatment on the structure of partially ion-exchanged titanate nanotubes," *Materials Chemistry and Physics* 91:409-416, 2005.

Young, "Anodic Oxide Films on Tantalum Electrodes: Part 1. Thickness and Current Efficiency of Formation," *Transactions of the Faraday Society* 50:153-171, 1954.

Zhang et al., "Hydrothermal Reaction Mechanism and Pathway for the Formation of $K_2Ti_6O_{13}$ Nanowires," *Advanced Functional Materials* 18:3018-3025, 2008.

Zhu et al., "Phase Transition between Nanostructures of Titanate and Titanium Dioxides via Simple Wet-Chemical Reactions," *Journal of the American Chemical Society* 127:6730-6736, 2005.

Zhuang et al., "Magnesium Silicate Hollow Nanostructures as Highly Efficient Absorbents for Toxic Metal Ions," *Journal of Physical Chemistry C* 113(24):10441-10445, 2009.

\* cited by examiner

FIG. 20
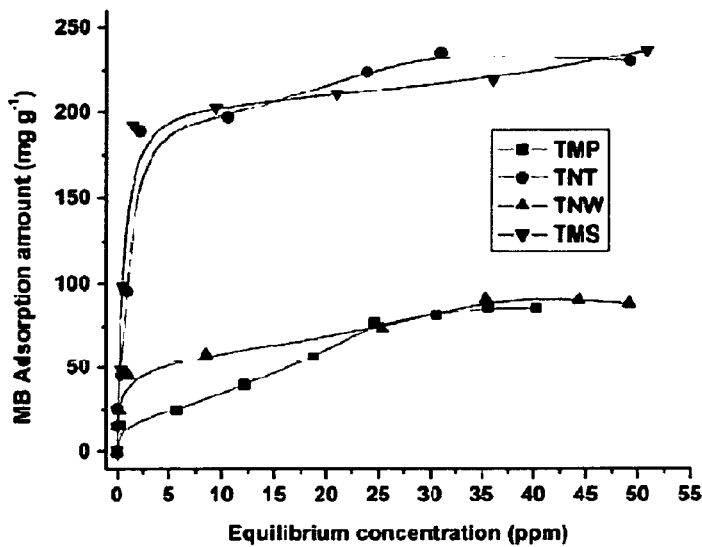
FIG. 21
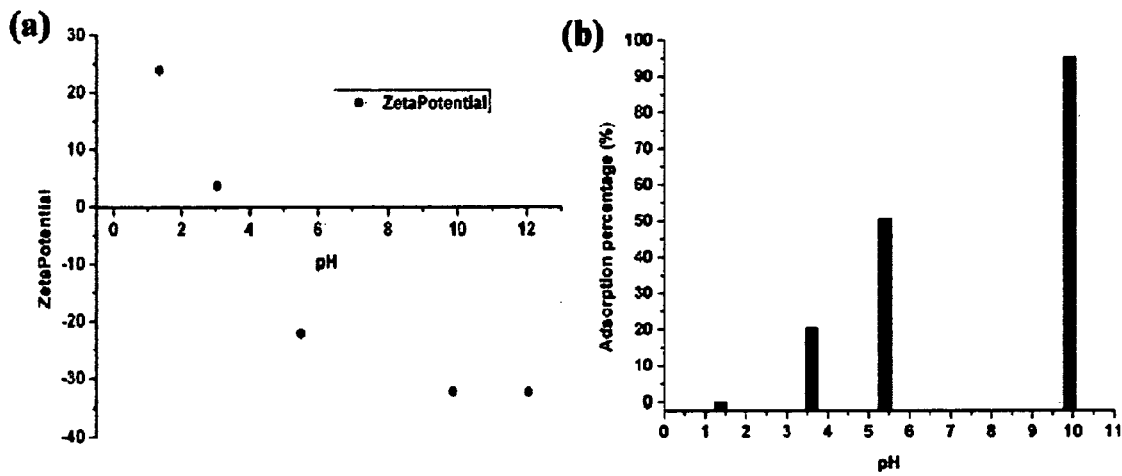
FIG. 22
Table 1  BET surface area and removal capacity of different absorbent samples
| Absorbent samples | BET surface area [$m^2 g^{-1}$] | Experimental capacity for MB [$mg g^{-1}$] | Experimental capacity for $Pb^{II}$ [$mmol g^{-1}$] |
| --- | --- | --- | --- |
| TMP | 1.07 | 80.8 ± 7.4 | 0.56 ± 0.03 |
| TNW | 13.82 | 94.6 ± 4.5 | 2.62 ± 0.06 |
| TNT | 157.64 | 232.2 ± 11.0 | 2.60 ± 0.05 |
| TMS | 277.52 | 236.2 ± 10.3 | 2.41 ± 0.06 |

FIG. 23

| Adsorbent sample | BET surface[a] | Removal capacity for $Pb^{2+}$ [b] |
|---|---|---|
| Zeolite | --- | 0.44 |
| Magnesium silicate | 355.21 | 0.314 |
| Actived carbon | 612, 686.3 | 0.64, 0.56 |
| Clay | 156 | 0.25 |
| Polymer resin | --- | 2.1 |
| Sodium trititanate (this work) | <50 | 0.56 |
| Titanate nanofiber | --- | 1.36 |
| Titanate TMS (this work) | 406 | 2.42 |

[a]($m^2 \cdot g-1$); [b]($mmol \cdot g^{-1}$); ---- not available

METHOD OF MANUFACTURING LAYERED METAL OXIDE PARTICLES AND LAYERED METAL OXIDE PARTICLES FORMED THEREOF

CROSS-REFERENCE TO RELATED APPLICATIONS

This application claims the benefit of priority of US provisional application No. 61/311,499, filed Mar. 8, 2010, the contents of it being hereby incorporated by reference in its entirety for all purposes.

FIELD OF THE INVENTION

The present invention refers to a method of manufacturing layered metal oxide particles and the thus produced layered metal oxide particles. The present invention also refers to a method of manufacturing a crystalline metal oxide nanosheet or a crystalline metal oxide nanoribbon.

BACKGROUND OF THE INVENTION

Layered materials with hierarchically structured materials have attracted a great amount of attention in recent years, as research have shown that the presence of hierarchical structures on materials can improve the performance of materials in various application areas such as optoelectronic, biomedical, and energy storage. By virtue of their highly porous structure and large specific surface area, these layered materials have excellent ion-exchange, molecular absorption, photoelectronicity and/or wettability contrast properties.

Functional materials such as silicon oxide ($SiO_2$), titania ($TiO_2$), tin oxide ($SnO_2$), and manganese oxide ($MnO_2$), and carbon (C) have been used in the synthesis of hierarchical structures such as column arrays, polyhedron-like particles, belt-branched, core-shell spheres and vesicles. Of these, titanium-based oxides, such as titania and titanate, are of particular interest because of their antimicrobial and self-cleaning properties.

Generally, formation of a hierarchical material is considered to be a self-assembly process, whereby building blocks, such as nanoparticles (0D), nanofibers or nanotubes (1D), and nanosheets (2D) self-assemble into a regularly arranged, higher level structure. The synthesis of the building blocks can take place via methods such as template assisted growth, solvothermal methods, and other template-free solution-based methods.

For example, current methods to manufacture titanate particles include the use of a hydrothermal method. However, this method suffers from drawbacks such as high processing pressures, heating of the processing solution (typically 100 to 200° C.), and a long processing time (ranging from 10 to 120 hours). These requirements can pose a limit on the process efficiency, thereby translating into high manufacturing costs during commercial production.

Other research in this area includes, for example, a molten-salt synthesis of a titania ($TiO_2$) mixture at 825° C. for 3 hours, or a high-temperature oxidation of sodium hydroxide (NaOH) coated titanium (Ti) foils at 800° C. for 1.5 hours in the presence of oxygen ($O_2$) and water ($H_2O$) vapor. However, these processes are complicated and require an even higher processing temperature compared to that used in the hydrothermal method.

Therefore, there remains a need for an improved method to manufacture layered materials, in particular, layered metal oxide particles which can by themselves be used directly in various applications or be used as building blocks to form materials for application.

SUMMARY OF THE INVENTION

In a first aspect, the present invention refers to a method of manufacturing layered metal oxide particles, the method comprising:
  placing a metal electrode in an electrolyte; and
  applying an electrical voltage to the electrode, wherein the metal electrode forms the anode, to form a metal oxide layer on the electrode surface,
wherein the electrical voltage applied is higher than the breakdown voltage of the metal oxide, thereby breaking down the metal oxide layer formed on the electrode surface into metal oxide particles that react with the electrolyte to form the layered metal oxide particles.

In a second aspect, the present invention refers to a method of manufacturing a crystalline metal oxide nanosheet or a crystalline metal oxide nanoribbon, the method comprising:
  placing a metal electrode in an electrolyte;
  applying an electrical voltage to the electrode, wherein the metal electrode forms the anode, to form a metal oxide layer on the electrode surface,
wherein the electrical voltage applied is higher than the breakdown voltage of the metal oxide thereby breaking down the metal oxide layer formed on the electrode surface into metal oxide particles, thereby forming a crystalline metal oxide nanosheet or a crystalline metal oxide nanoribbon on the metal electrode.

BRIEF DESCRIPTION OF THE DRAWINGS

The invention will be better understood with reference to the detailed description when considered in conjunction with the non-limiting examples and the accompanying drawings, in which:

FIG. 13 (b) is a HRTEM image of the selected area in FIG. 13 (a).

FIG. 20 is a graph showing adsorption isotherms of MB dye by TMP, TNT, TNW and TMS particles. The experiment was carried out with 50 mL of MB solution with varying concentrations from 20 to 100 ppm for 72 h. In each run, 10 mg of adsorbent was added to the solution. The pH value of the solution was within the range of 9.5 to 10.

FIG. 21 are graphs showing (a) Zeta potential of the TNT sample in different pH solutions. The initial solution was prepared by dispersing the particles in 0.1 M NaCl solution. The pH value is adjusted by dilute HCl and NaOH solution. b) Effect of solution pH on the adsorption MB on TNT ($C_o$=20 ppm) after 72 h.

FIG. 22 is a table summarizing the BET surface area and removal capacity of different absorbent samples.

FIG. 23 is a comparison table of the BET surface area and removal capacity of $Pb^{2+}$ for different absorbent samples.

DETAILED DESCRIPTION OF THE PRESENT INVENTION

Figure 1:
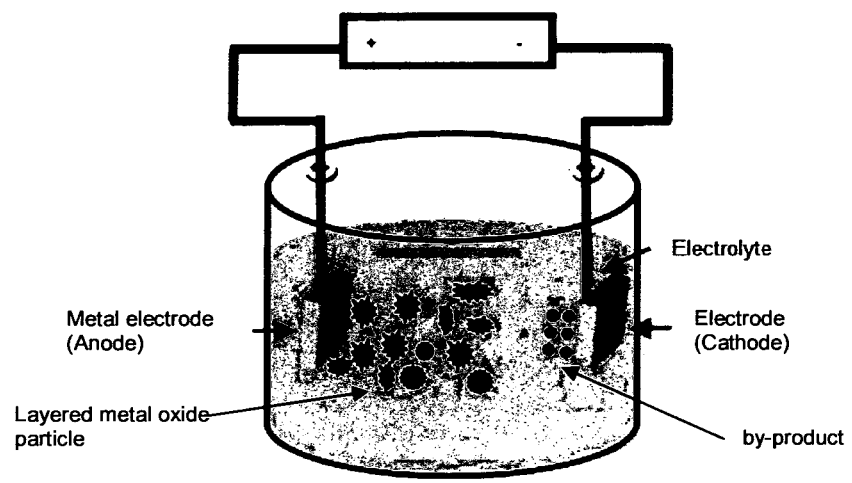
FIG. 1 is a schematic diagram of an apparatus set-up for carrying out a reaction process according to an embodiment of the present invention.

In a first aspect the present invention refers to a method of manufacturing layered metal oxide particles. The method includes placing a metal electrode in an electrolyte, wherein the electrode forms the anode. Upon application of an electrical voltage to the metal electrode, a metal oxide layer is formed on the electrode surface. The electrical voltage is higher than the breakdown voltage of the metal oxide layer, which breaks down the metal oxide layer to form metal oxide particles that react with the electrolyte to form the layered metal oxide particles. Using a method of the present invention, layered metal oxide particles with a high specific surface area can be obtained.

The term "particles" as used herein refers to nanoparticles, microparticles, or a combination of nanoparticles and microparticles. Accordingly, the term "metal oxide particles" refers to nanoparticles, microparticles, or a combination of nanoparticles and microparticles comprising, consisting essentially of or consisting of a metal oxide. The layered metal oxide particle can be formed from a metal selected from the group consisting of titanium (Ti), zirconium (Zr), hafnium (Hf), vanadium (V), niobium (Nb), tantalum (Ta), manganese (Mn) and alloys thereof. In one exemplary embodiment, the metal is titanium. The layered metal oxide particles of the invention can comprise one or more different metal oxides in distinct layers.

The layered metal oxide particles can be of any shape. For example, the layered metal oxide particle can be a sphere, a rod, a cube, or irregularly shaped. In some embodiments, the layered metal oxide particle is a sphere. As the shape of a particle is not always regular, e.g. perfectly spherical, size of the particle can be characterized by a maximal dimension which refers to the maximum dimension of the particle in any direction. The layered metal oxide particles according to the present invention can have a maximal dimension of between about 0.1 µm to 10 µm, such as between about 5 µm to about 10 µm, about 3 µm to about 5 µm, about 2 µm to about 4 µm, about 1 µm to about 3 µm, about 0.1 µm to about 2 µm, about 0.5 µm to about 1 µm, e.g. about 0.5 µm, about 0.6 µm, about 0.7 µm or about 0.8 µm. In some embodiments, the layered metal oxide particle has a maximal dimension of between about 0.4 µm to about 1.5 µm.

The metal in the layered metal oxide particle can be derived from the metal of a metal electrode that is placed in an electrolyte. In other words, according to a method of the present invention, the layered metal oxide particles can be formed from the material of the metal electrode. In one embodiment, a titanium (Ti) foil can be used as the metal electrode to form layered metal oxide particles comprising titanate.

Generally, the metal electrode forms the anode of an electrolytic cell. The term "electrolytic cell" as used herein refers to an apparatus that converts electrical energy into chemical energy, or brings about a chemical reaction when connected to an outside source of electricity. The electrolytic cell can contain two or more electrodes in contact with an electrolyte. Besides the metal electrode which can form the anode, the electrode set-up in an electrolytic cell can include a counter electrode and/or a reference electrode. The counter electrode can form a cathode to counterbalance the electrochemical processes at the anode. The counter electrode and/or the reference electrode can be any material that is able to conduct electricity. Examples of materials that can be used to form the counter electrode include, but are not limited to, noble metals such as platinum, silver and gold, transition metals such as nickel, lead and zinc, and non-metals such as graphite and conductive polymers. In some embodiments, the counter electrode can be the same material as the metal electrode. In one illustrated embodiment, a titanium foil is used as the metal electrode and platinum is used as the counter electrode.

The distance between the metal electrode and the counter electrode can vary, depending for example, on the type of electrolyte used, the concentration of the electrolyte and the electrical voltage applied to the electrodes. In some embodiments, the distance between the electrodes is between about 2 cm to about 10 cm, such as about 3 cm or about 5 cm.

The method of the present invention comprises placing the metal electrode in an electrolyte. An electrolyte refers to a substance that is electrically conductive and comprises free ions. The free ions may be generated by application of a voltage. Examples of an electrolyte include, but are not limited to, water, a non-aqueous solvent, such as an alcohol, acetic acid, acetone or acetonitrile, an aqueous solution of a salt, for example an alkali metal salt, an acid such as hydrochloric acid, sulfuric acid, phosphoric acid or a perhalogenoic acid, or a salt in its molten state or dissociated into its ions in a solvent such as water. A suitable electrolyte that can be used in a method of the present invention is one that is capable of reacting with the metal oxide particles spalled from the electrode to form layered metal oxide particles. For example, the electrolyte can react with the metal oxide to form a different material having a layered crystal structure. In some embodiments, the electrolyte is an aqueous solution of an alkali metal salt. Examples of an alkali metal salt include, but are not limited to, alkali metal hydroxides, such as sodium hydroxide, potassium hydroxide, lithium hydroxide, cesium hydroxide and mixtures thereof. In one exemplary embodiment, an aqueous solution of sodium hydroxide is used as the electrolyte.

The electrolyte can be of any concentration. For example, the concentration of the alkali metal salt can be between about 1 M to about 20 M, such as about 1 M to about 15 M, about 1 M to about 10 M, about 1 M to about 5M, about 10M to about 20 M, about 5M to about 10 M, or about 10 M.

An electrical voltage can be applied to the metal electrode to form a metal oxide layer on the electrode surface. When driven by an external voltage applied to the electrodes, the electrolyte provides ions that flow to and from the electrodes, where charge-transferring, or faradaic, or redox reactions can take place. The metal electrode can function as the anode in the electrolytic cell to form cations, which can remain bound on the surface of the metal electrode. The cations can interact with anions in solution to form a layer of metal oxide on the electrode surface. In one illustrated embodiment, the cation is a titanium ion ($Ti^{4+}$) which interacts with a hydroxyl ion ($OH^-$) present in the sodium hydroxide (NaOH) electrolyte to form a layer of titania ($TiO_2$) on the titanium anode surface. The counter electrode can function as the cathode in the electrolytic cell. In one exemplary embodiment, at the platinum cathode hydrogen gas is formed.

The method of the present invention comprises the application of an electrical voltage that is higher than the breakdown voltage of the metal oxide layer. The term "breakdown voltage" as used herein refers to the minimum voltage required to destruct the metal oxide layer, i.e. the metal oxide layer is broken down into metal oxide particles with/without any changes to the molecular structure of the metal oxide. When an electrical voltage higher than the breakdown voltage of the metal oxide layer is applied to the electrode, current can be forced to flow through the metal oxide layer, which can result in localized current leakage at the points of breakdown. The metal oxide layer formed on the electrode surface can be broken down into metal oxide particles, and can result in a vigorous spark discharge of the metal oxide particles into the electrolyte. If a voltage higher than the breakdown voltage is applied to the electrode, metal oxide can be formed at the electrode surface and can result in continuous spallation of metal oxide as particles into the electrolyte.

The breakdown voltage of the metal oxide layer can depend on the type of metal oxide as well as the thickness of the metal oxide layer. Generally, the breakdown voltage of the metal oxide layer can be experimentally determined or otherwise characterized using its specific dielectric strength values (expressed in terms of kilovolts per millimeter ($kV\ min^{-1}$)).

In some embodiments, the electrical voltage applied to the electrode is between 25 V to 100 V, such as about 25 V to 75 V, about 25 V to 50 V, or about 50 V to 100 V. In some embodiments, the metal oxide layer comprises titania having a breakdown voltage of 25 V. Using an electrical voltage greater than 25 V, such as between about 27 V to 31.5 V, the metal oxide layer comprising titania is broken down into metal oxide particles comprising titania.

The electrical voltage applied to the electrode generates a current density at the electrode, where current density is a measure of the current passing through an electrode per unit area of the electrode. Typically, the electrical voltage applied to the electrode generates a current density of between about 0.1 A cm$^{-2}$ to 10 A cm$^{-2}$, such as between about 0.1 A cm$^{-2}$ to 5 A cm$^{-2}$, 0.1 A cm$^{-2}$ to 0.5 A cm$^{-2}$, about 0.1 A cm$^{-2}$ to 2 A cm$^{-2}$, about 0.1 A cm$^{-2}$ to 1 A cm$^{-2}$, such as about 0.25, A cm$^{-2}$, about 0.5 A cm$^{-2}$, about 0.75 A cm$^{-2}$ or about 1 A cm$^{-2}$.

Due to the exothermic nature of the reaction, the spark discharged metal oxide particles can have a temperature higher than that of the electrolyte, which can in turn increase the electrolyte solution temperature. The method of manufacturing layered metal oxide particles can be carried out at any solution temperature, such as about 10° C. to about 200° C., about 10° C. to about 100° C., about 10° C. to about 75° C., about 50° C. to about 100° C., or about 10° C. to about 50° C., such as about 25° C. The method of manufacturing layered metal oxide particles can be carried out at any pressure, such as about 1 bar to about 150 bars, about 1 bar to about 100 bar, about 0.1 bar to about 50 bar, about 1 bar to about 20 bar or about 1 bar to about 5 bar. In particular, it has been demonstrated that the method of the present invention can be carried out at a pressure of about 1 bar i.e. under atmospheric pressure at room temperature.

The metal oxide particles can react with the electrolyte to form the layered metal oxide particles. The term "layered" as used herein refers to one or more layers of the metal oxide particles. For example, the layers can be in the form of individual structures such as 2D flakes or nanoribbons on the metal oxide particles, wherein each flake or nanoribbon forms a layer. In one illustrated embodiment, layered titanate material is composed of numerous titanate layers. The interlayer distance can be between about 0.5 nm to about 5 nm, such as between about 0.5 nm to about 3 nm, or between about 0.5 nm to about 1 nm.

In exemplary embodiments, the layered metal oxide particle comprises titanate. For example, when sodium hydroxide is used as the electrolyte, sodium titanate can be obtained. After washing the layered metal oxide particles with an aqueous solution such as water, sodium hydrogen titanate can be generated. Hydrogen titanate can be prepared via hydrogen ion-exchange in acid conditions. The titanate can be denoted by the formula $Na_xH_{2-x}Ti_2O_5 \cdot H_2O$, where when x=0 (hydrogen titanate), 1 (sodium hydrogen titanate) or 2 (sodium titanate).

The layered materials can form a hierarchical or 3D structure on the layered metal oxide particle. For example, the layers can be in the form of individual structures, such as 2D flakes or ribbons, centered or radiating from the core, thereby forming a hierarchical morphology. The individual structures can form pores on the layered metal oxide particles, wherein the term "pores" refers to the spaces in between the structures, such as flakes or ribbons, of the layered metal oxide particle. The surface of the layered metal oxide particles can comprise mesopores and/or macropores. According to IUPAC definition, macropores are considered pores with a size of between about >50 nm to about 5 μm while mesopores have a size of between about 2 nm to about 50 nm. The average pore size of the pores on the surface of the layered metal oxide particles can range between about 2 nm to about 500 nm, such as about 2 nm to about 300 nm, about 2 nm to about 200 nm, about 2 nm to about 100 nm, about 2 nm to about 50 nm, about 5 nm to about 30 nm, about 5 nm to about 20 nm, or about 5 nm to about 10 nm, e.g. about 5 nm, about 6 nm, about 7 nm or about 8 nm. In one illustrated embodiment, the layered metal oxide particles comprise mesopores with small average pore of 7.5 nm for NaH-TMS and 4.4 nm for H-TMS.

Due to the porous structure, the layered metal oxide particles have a high surface area. For example, the layered metal oxide particles can have a surface area of between about 10 m$^2$ g$^{-1}$ to about 500 m$^2$ g$^{-1}$. In some embodiments, the layered metal oxide particles can be characterized by a large surface area, which can be between about 300 m$^2$ g$^{-1}$ to about 500 m$^2$ g$^{-1}$. In one illustrated embodiment, the surface area of the layered metal oxide particle is about 406 m$^2$ g$^{-1}$.

The method of the present application can further comprise adding an acid to the layered metal oxide particles. For example, the acid can be added to convert the sodium titanate into hydrogen titanate. Examples of acids that can be used include, but not limited to, hydrochloric acid, nitric acid, sulfuric acid, phosphoric acid and their mixture thereof.

In a second aspect, the present invention refers to a method of manufacturing a crystalline metal oxide nanosheet or nanoribbon. A nanosheet as used herein refers to a material having an ultrathin thickness on the order of nanometers, such as about 1 nm, and a lateral size of up to several tens of micrometers. The term "nanoribbon" can be used to describe a nanosheet of a smaller dimension. They can be highly crystalline, and therefore, a nanosheet or nanoribbon can sometimes be considered as a 2D single crystal.

The method comprises placing a metal electrode in an electrolyte, wherein the metal electrode forms the anode. Suitable metals that can be used as the metal electrode have already been described herein. By applying an electrical voltage that is higher than the breakdown voltage of the metal oxide to the electrode, a metal oxide layer that is formed on the electrode surface is broken down into metal oxide particles, which can result in a vigorous spark discharge of the metal oxide particles into the electrolyte. The porous metal oxide nanosheet can react with the electrolyte to form a crystalline metal oxide nanosheet or a crystalline metal oxide nanoribbon on the metal electrode.

The invention illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

EXPERIMENTAL SECTION

FIG. 1 is a schematic diagram of an apparatus set-up for carrying out a reaction process according to an embodiment of the present invention. A metal electrode is placed in an electrolyte, which can form the anode of an electrolytic cell. The electrolytic cell shown in FIG. 1 comprises a second electrode which functions as the cathode. An electrical voltage is applied to the metal electrode to form a metal oxide layer on the electrode surface. As the electrical voltage is higher than the breakdown voltage of the metal oxide, the metal oxide layer formed on the electrode surface is broken down into metal oxide particles, which react with the electrolyte to form layered metal oxide particles. The porous metal oxide nanosheet can react with the electrolyte to form a crystalline metal oxide nanosheet or a crystalline metal oxide nanoribbon on the metal electrode.

Example 1: Preparation of Materials

Figure 2:
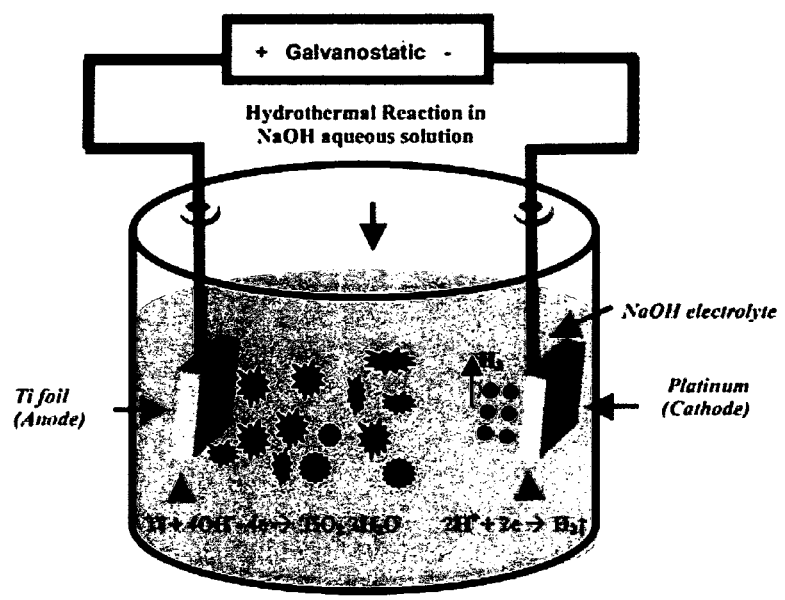
FIG. 2 is a schematic diagram of an apparatus set-up for carrying out a reaction process by electrochemical spark discharge spallation of titanium according an embodiment of the present invention.

FIG. 2 is a schematic diagram of an apparatus set-up to form layered titanium oxide particles according an embodiment of the present invention. The apparatus set-up is a two-electrode electrochemical cell connected to a direct current (DC) power supply. Titanium (Ti) foil of 0.25 mm thickness and 99.7% purity purchased from Aldrich Corporation was used as the anode. The exposed area of titanium foil was about 2 $cm^{-2}$ for all the experiments. The titanium foil was degreased by alcohol and cleaned by deionized (DI) water, followed by chemically polishing using a polishing solution of concentrated nitric acid and hydrofluoric acid mixed at a volumetric ratio of 1:1. Subsequently, the titanium foil was cleaned by DI water and dried by nitrogen ($N_2$) gas prior to use. 10 M sodium hydroxide (NaOH) in aqueous solution (99% purity, Alfa-Aesar Corporation, Ward Hill, Mass.) was used as the electrolyte. Platinum was used as the counter-electrode.

Anodization was conducted in galvanostatic mode at current densities ranging from 0.25 to 1.0 A $cm^{-2}$ at room temperature (about 25° C.) without any heating or stirring throughout the entire anodization process. Distance between the two electrodes was about 3 cm. To ensure laboratory safety, the experiments were carried out under good ventilation in a fume hood so that any gases generated as a by-product of the reaction, for example, hydrogen ($H_2$), can be safely removed. In order to investigate the electrochemical spallation behavior and the variation of solution temperature, the temporal evolutions of anodic voltage and the solution temperature with time were obtained by using a digital multimeter and thermometer recorder interfaced with a computer respectively.

After the experiment was completed, a grey white precipitate of sodium titanate was collected from the solution, centrifuged and washed with DI water until the pH value of the solution was about 7. Hydrogen titanate was obtained by soaking the precipitates in hydrochloric acid (HCl) solution (0.1 M) for 3 hours, followed by washing in DI water and absolute ethanol, with subsequent drying in air. This process was repeated three times.

Prior to observation using a field emission scanning electron microscope (FESEM), the surface of the titanium foil was rinsed for a few times with DI water and dried by nitrogen gas.

Example 2: Characterization

The morphologies of the as-synthesized sodium titanate particles and titanium anode surface after anodization were investigated by a field emission scanning electron microscope (FESEM, JEOL JSM-6340F). A transmission electron microscope (TEM, JEOL JEM-2010) operating at 200 kV was used to characterize the detailed nanostructures. For TEM observation, the particle suspension was dropped onto a copper grid and dried at room temperature. Energy dispersive X-ray analysis was carried out in attachments in the TEM and FESEM. A Shimadzu 6000 X-ray diffractometer with a Cu $K_\alpha$ source was used for phase identification. Nitrogen adsorption/desorption isotherms were measured at 77 K using ASAP2000 adsorption apparatus from Micromeritics. The samples were degassed at 373 K for 4 hours under vacuum before analysis. Raman measurements were performed at room temperature in a WITEC confocal spectrometer with a 488 nm excitation laser operated at a low power level (1 mW), and the Si peak at 520 $cm^{-1}$ was used as a reference for the wave number calibration.

Example 3: Adsorption Test

Heavy toxic $Pb^{II}$ and methylene blue (MB) were used in the adsorption tests to determine and compare the adsorption performance of the as-synthesized titanate microspherulite (TMS), titanate micro-particle (TMP), titanate nanowire (TNW) and titanate nanotube (TNT) samples.

The adsorption experiments were conducted at stirring condition throughout the experiment at room temperature (25° C.) in the dark. For the MB dye, the equilibrium adsorption isotherm was determined by a concentration variation method. The experiment was carried out with 50 mL of MB solution with varying concentration from 20 to 100 ppm In each run, 10 mg of adsorbent was added to the solutions. The pH value was within the range of 9.5 to 10. After 72 hours, equilibrium was reached and the equilibrium concentration was measured.

The adsorption kinetics test was carried out using 100 mL of MB solution at an initial concentration of 20 ppm. In each run, 10 mg of the synthesized powder was added. The quantitative determination of the MB concentration in solution at different time intervals was performed by measuring the intensity change absorption peak (at 665 nm) of the sample solution under a Perkin-Elmer UV-Vis-NIR Lambda 900 spectrophotometer. The $Pb^{II}$ exchange isotherm was measured by equilibrating 20 mg of the adsorbents in 50 mL of $Pb(NO_3)_2$ having concentration range of 0.1 to $2.0 \times 10^{-3}$ M for 72 hours The initial pH value of the prepared solutions was adjusted to about 5.0 to 5.5 during the adsorption process to avoid the formation of $PbCO_3$ or $Pb(OH)_2$ on the titanate surface. The adsorption kinetics was also investigated. 5 mL of $Pb^{II}$ suspension solution after equilibrating an adsorbent with the solution were collected at 5, 10, 20, 30, 60 and 120 min, respectively. The collected samples were centrifuged and filtered, and concentrations of $Pb^{II}$ were determined by inductively coupled plasma optical emission spectroscopy (ICP-OES)

Example 4: Electrochemical Spark Discharge Spallation Behavior

Figure 3:
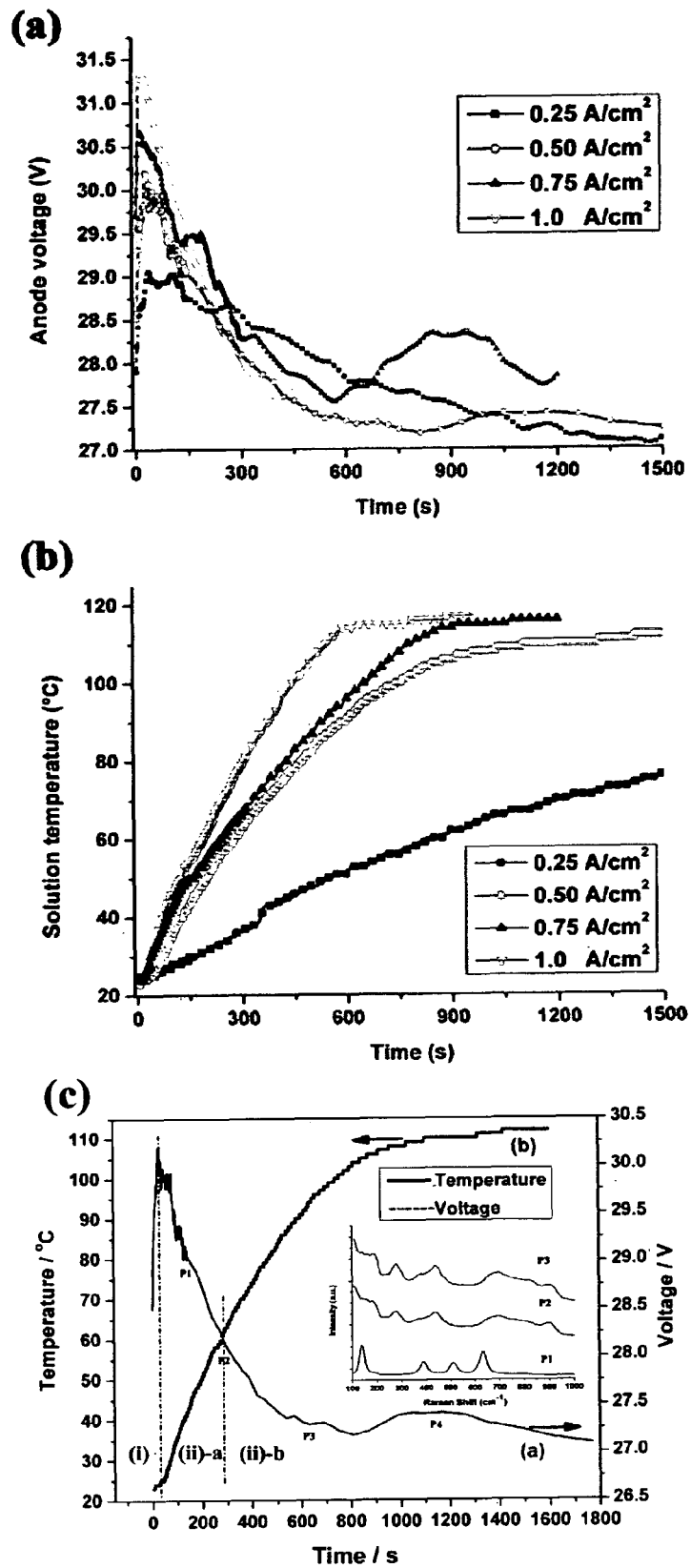
FIG. 3 are graphs showing (a) dependence of the anodic voltage; (b) solution temperature with anodization time in a 10 M NaOH solution at different current densities of 0.25 A $cm^{-2}$, 0.50 A $cm^{-2}$, 0.75 A $cm^{-2}$, and 1.0 A $cm^{-2}$; (c) anodic voltage and solution temperature with anodization time curves superimposed on the same graph for the current density of 0.50 A $cm^{-2}$. Inset shows Raman scattering spectra of the powders collected from the solution at different durations marked at the plot. FESEM and TEM images of powders samples taken at points marked P1, P2 and P3 in FIG. 3(c) are denoted as (d, e), (f, g), (h, i) respectively. The inset images are the magnified views of the same samples.
Figure 3:
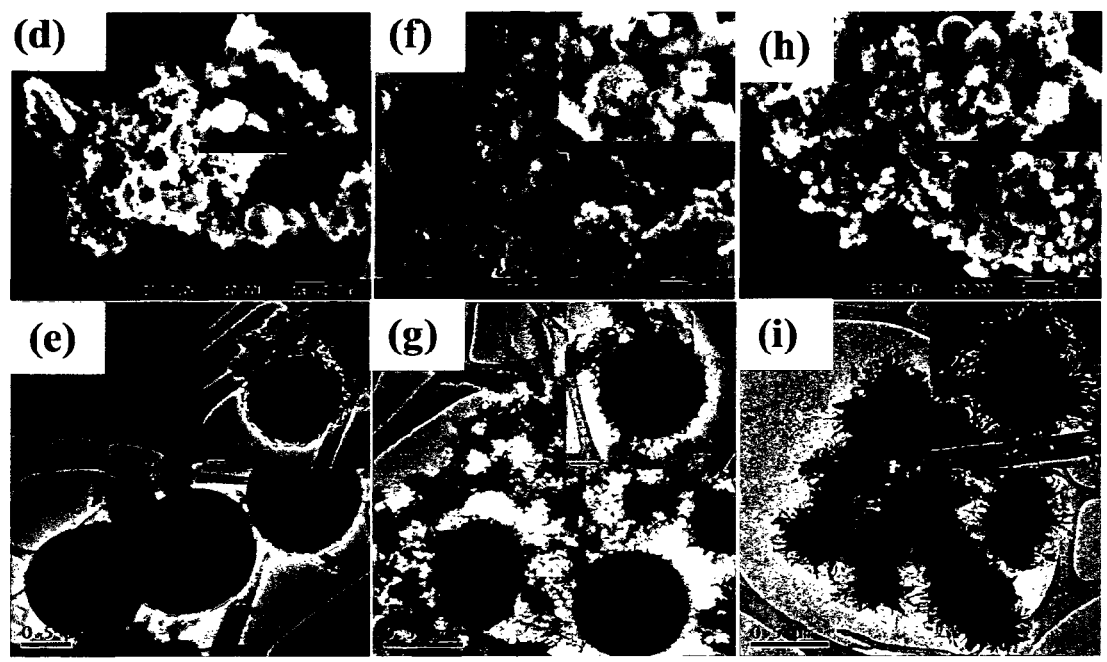

FIG. 3 are graphs showing (a) anodic voltage and (b) solution temperature with time at different current densities of 0.25 A $cm^{-2}$, 0.50 A $cm^{-2}$, 0.75 A $cm^{-2}$, and 1.0 A $cm^{-2}$; (c) anodic voltage and solution temperature with anodization time curves superimposed on the same graph for the current density of 0.50 A cm$^{-2}$. Inset shows Raman scattering spectra of the powders collected from the solution at different durations marked at the plot. FESEM and TEM images of powders samples taken at points marked P1, P2 and P3 in FIG. 3(c) are denoted as (d, e), (f, g), (h, i) respectively. The inset images are the magnified views of the same samples.

Referring to FIG. 3(a), the applied anodization voltage of between 27.0 to 31.5 V is higher than the experimental breakdown voltage of about 25 V for TiO$_2$ in a 10 M NaOH solution. As a result, the oxide layer at the electrolyte/oxide interface is electrically broken down and spalled into the solution as small precipitates by the generated spark discharge.

This electrochemical spallation behaviour can be explained using the voltage-time and temperature-time plots in FIGS. 3(a) and 3(b). At the early stage from 0 seconds to about 15 seconds in FIG. 3(a) dielectric breakdown occurs and anode voltage increases linearly with anodization time. This linear increase in voltage and galvanostatic oxide thickness can be explained by the high field-assisted ionic transport mechanism detailed as follows.

The relationship between the anodic current and the electric field strength across the anodic oxide film can be described by $$I = A \cdot \exp(B \cdot U/d) \quad \text{Equation (1)}$$

where I is the ionic current, A and B are electrolytic constants, U is the forming voltage and d is the anodic oxide thickness. During galvanostatic anodization, a constant electric field strength (U/d) across the previously formed barrier film is required in order to maintain a constant current density. When the anodization starts, a titanium oxide (TiO$_2$) layer is formed due to interaction of the surface Ti$^{4+}$ ions with hydroxyl ions (OH$^-$) in the solution. The oxide thickness increases with time as more of the generated Ti$^{4+}$ ions interacts with the hydroxyl ions. As a result, the oxide thickness increases with time. To maintain the current density while taking into account of the increasing thickness of the oxide layer, the voltage across the oxide film increases and results in the initial linear increase in voltage as shown in FIG. 3(a). At this initial phase, it is observed that a higher anode voltage is needed when the anodization is conducted at a higher current density. With an increase in solution temperature, this trend is changed. The gradual increase of solution temperature as a consequence of the exothermic reaction can be observed in FIG. 3(b).

Based on Ohm's law, total resistance for the anodization system, R is denoted by Equation (2) which states that $$R = R_c + R_{a/e} + R_e + R_{c/e} \quad \text{Equation (2)}$$

where $R_c$ denotes the resistance of the circuit, $R_{a/e}$ denotes the resistance of the anode/electrolyte interface, $R_e$ denotes the resistance of the electrolyte, and $R_{c/e}$ denotes the resistance of the cathode/electrolyte interface.

During the spark discharge process, $R_e$ decreases as the temperature rise accelerates the ionic mobility of the electrolyte. $R_{a/e}$ also decreases due to the spallation and dissolution of the compact TiO$_2$ layer. As a result, R decreases. Consequently, the anodic voltage (=I.R) decreases after the maximum voltage is reached under constant current density mode. Fluctuation of anode voltage is observed, which can be the result of the instantaneous change of the total resistance (R) and evolution of gas from the electrodes during the dielectric breakdown.

Figure 4:
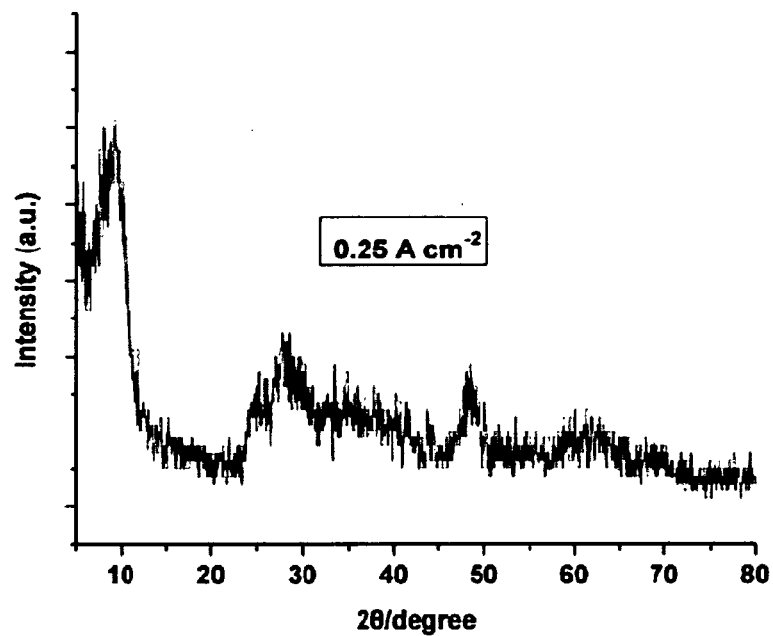
FIG. 4 is a graph showing the X-ray Diffraction (XRD) pattern of the titanate micro-spherulite (TMS) materials obtained using an initial current density of 0.25 $Acm^{-2}$.

Under different current densities, the electrochemical spark discharge spallation process generates different amounts of heat from the exothermic reaction. When the process is conducted at high current density, the solution temperature increases at a faster rate. For example, under a lower current density of 0.25 A cm$^{-2}$, the solution temperature was around 78° C. after 25 minutes of anodization due to limited heat derived from the anode. When the current density is increased to a value of 0.5 A cm$^{-2}$ and above, a rapid increase in solution temperature (about 110° C.) was observed. FIG. 4 is a graph showing the X-ray Diffraction (XRD) pattern of the titanate materials obtained using an initial current density of 0.25 A cm$^{-2}$. The XRD result indicates that the titanate material can be formed at low temperatures of about 78° C. using a current density of 0.25 A cm$^{-2}$. As the morphologies of the titanate particles formed under different current densities are quite similar, a current density of 0.5 A cm$^{-2}$ was used in all subsequent experimental studies.

Example 5: Characterization of the Hierarchical Titanate TMS Materials

Figure 5:
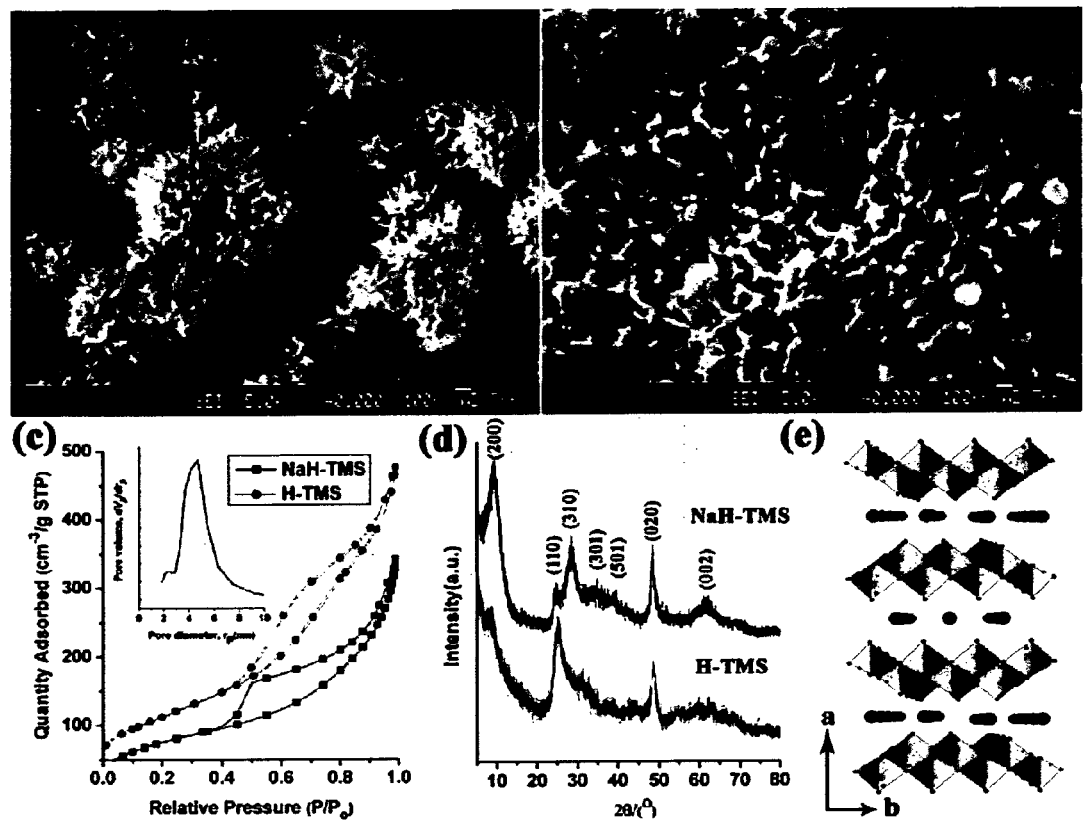
FIG. 5 are FESEM images of the synthesized (a) sodium hydrogen TMS (NaH-TMS); (b) porous $TiO_2$ nanosheet thin film left on Ti foil surface by ESDS method in 10 M NaOH solution for 20 minutes; (c) isotherm nitrogen sorption of NaH-TMS and H-TMS; (d) XRD patterns of as-prepared NaH-TMS and hydrogen TMS (H-TMS); (e) polyhedral representation of orthorhombic $Na_xH_{2-x}Ti_2O_5 \cdot H_2O$. Interlayer water molecules ($H_2O$) are not shown. The dot between the layers is $Na^+$ or $H^+$. The samples were anodized at a current density of 0.5 A cm$^{-2}$. The inset in (c) shows a pore volume distribution of H-TMS (BJH desorption).

Field emission scanning electron microscope (FESEM) images of the TMS particles and the porous TiO$_2$ oxide layer on the Ti foil surface after 20 minutes of electrochemical spark discharge spallation (ESDS) processing at a current density of 0.5 A cm$^{-2}$ are shown in FIG. 5(a) and FIG. 5(b) respectively. The electrolyte turned from clear in the beginning of the process to turbid due to formation of white precipitates of sodium titanate. After the ESDS treatment, the as-prepared sodium-hydrogen titanate microspherullite (TMS) (NaH-TMS) particles with diameters ranging from 0.4 mm to 1.5 mm were well dispersed (FIG. 5(a)). Many fine structures radiated from the core of the spherulite, and are shown to possess a nano-flake structure. The NaH-TMS could be transformed to hydrogen titanate TMS (H-TMS) with the same morphology after acid washing.

Figure 6:
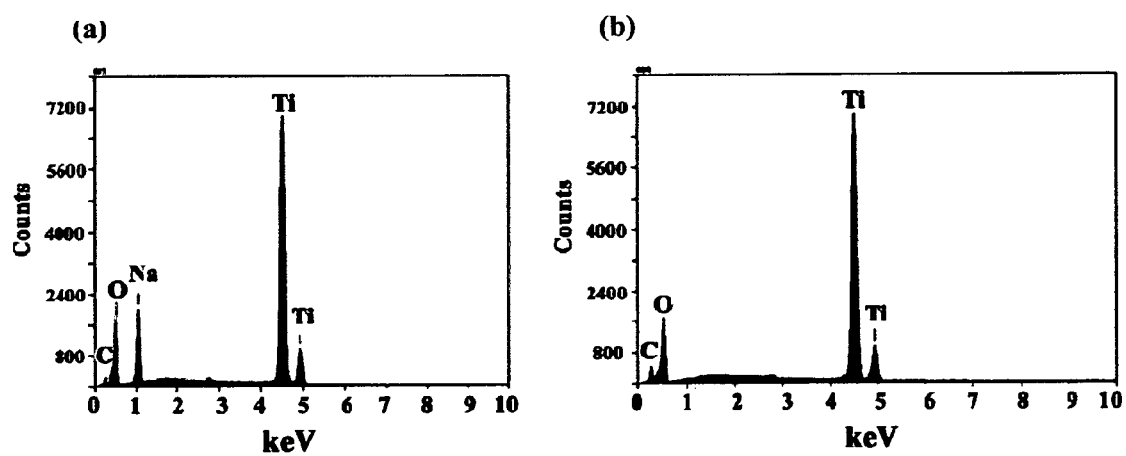
FIG. 6 shows FESEM-EDS data of as prepared powders of (a) NaH-TMS and (b) H-TMS.
Figure 7:
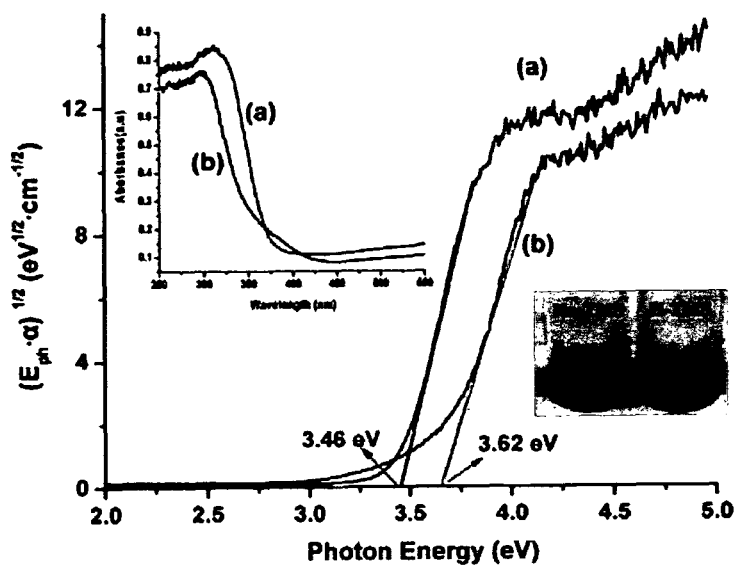
FIG. 7 is a graph showing Tauc's plots for band gap determination of as-prepared (a) H-TMS and (b) NaH-TMS samples anodized at a current density of 0.5 A cm$^{-2}$; the insets show their UV-visible diffuse reflectance spectra (left) and the digital photos (right).

FIG. 6 shows FESEM-EDS data of as prepared powders of (a) NAH-TMS and (b) H-TMS. The energy dispersive X-ray spectroscopy (EDS) data as shown in the figure provide the supporting evidence for the transformation from NaH-TMS to H-TMS as there was no indication of Na element in the H-TMS graph. The optical band gaps of NaHTMS and H-TMS are evaluated from Tauc's plot, as shown in FIG. 7. FIG. 7 is a graph showing Tauc's plots for band gap determination of as-prepared (a) H-TMS and (b) NaH-TMS samples anodized at a current density of 0.5 A cm$^{-2}$; the insets show their UV-visible diffuse reflectance spectra (left) and the digital photos (right). Semiconductors absorb light below a threshold wavelength, the fundamental absorption edge, which is related to the band gap energy (Eg) via the following equation $$E_g \text{ (eV)} = 1240/\lambda_g \text{ (nm)} \quad \text{Equation (3)}$$

For a direct band gap transition of titanate materials, the absorption coefficient ($\alpha$) is related to the photon energy ($E_{ph}$) via the following equation $$(E_{ph} \cdot \alpha) = B(E_{ph} - E_g)^{0.5} \quad \text{Equation (4)}$$

From the Tauc plot of $(E_{ph} \cdot \alpha)^{0.5}$ vs. $E_{ph}$, the band gap energy can be determined by extrapolating the linear region. Calculated from the above equations, the onset wavelengths of NaH-TMS and H-TMS are about 342 nm and 358 nm, corresponding to the band gap value of 3.62 eV and 3.46 eV respectively. These values are in the same range with previous reports of titanates.

Typical isotherms for nitrogen adsorption and desorption on the surfaces of the as-prepared NaH-TMS and H-TMS conducted at 77 K are shown in FIG. 5(c), and the Barrett-Joyner-Halenda (BJH) pore size distribution is shown in the inset. Typical type-IV nitrogen ($N_2$) sorption isotherms with a distinctly increasing step in the middle relative pressures were observed for NaH-TMS and H-TMS, which are characteristic for mesoporous structures (FIG. 5(c)). The NaH-TMS has a high Brunauer-Emmett-Teller (BET) surface area of 277.52 $m^2$ $g^{-1}$ with a pore volume of 0.52 $cm^3$ $g^{-1}$. The average pore size of the NaH-TMS is about 7.5 nm.

Figure 8:
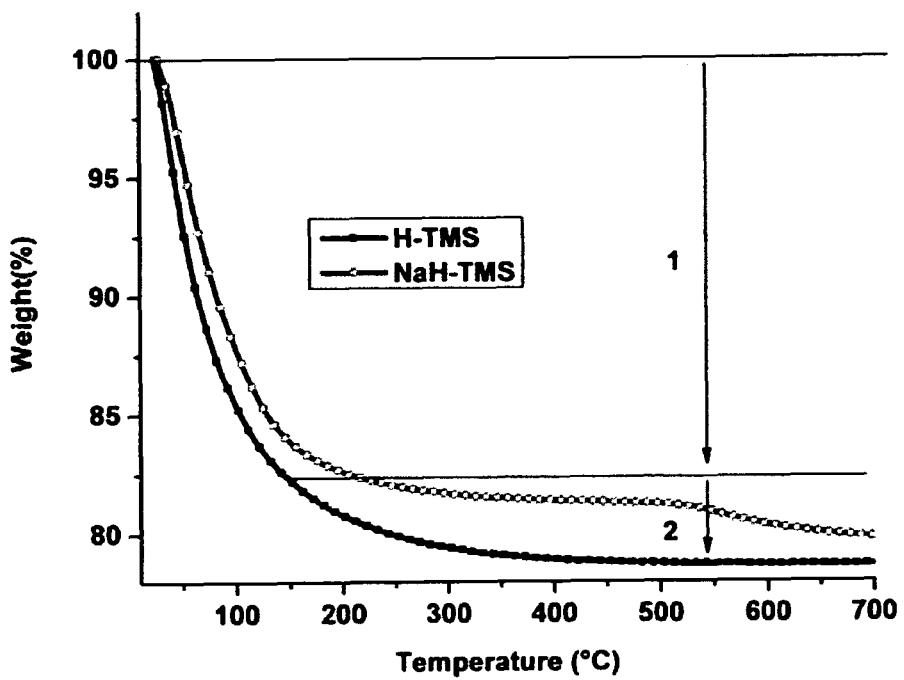
FIG. 8 is a graph showing thermogravimetric analysis (TGA) curves of the as-prepared powders of NaH-TMS and H-TMS measured at a heating rate of 10° C. min$^{-1}$ under nitrogen ($N_2$) flow.

After acid washing, the H-TMS materials show higher BET surface areas (406.41 $m^2$ $g^{-1}$) and larger pore volumes (0.76 $cm^3$ $g^{-1}$), which come from mesopores of H-TMS possessing a narrow pore size distribution with a peak value of 4.4 nm. The gaps between the thin nano-flakes clearly contribute to the mesoporosity. FIG. 5(d) shows the crystal structure of the as-prepared TMS. The low diffraction angle at about 9° of the NaH-TMS or H-TMS indicates the product possesses a large inter-plane distance, which is common for layered titanate structures. The broad peaks at $2\theta=9.2°$ (d=9.61 Å), 24.6° (d=3.62 Å), 28.5° (d=3.13 Å), 34.9° (d=2.57 Å), 38.8° (d=2.31 Å), 48.3° (d=1.88 Å), and 62° (d=1.50 Å) of NaH-TMS correspond well with the (200), (110), (310), (301), (501), (020), and (002) planes of orthorhombic $H_2Ti_2O_5 \cdot H_2O$ (JCPDS No. 47-0124). This type of crystal structure consists of lepidocrocite-type host layers (shown in FIG. 5(e)) is similar to those in the layered $H_{0.7}Ti_{1.825}D_{0.175}O_4 \cdot H_2O$ (D: vacancy) but with different protons. Moreover, thermogravimetric analysis of the TMS sample shown in FIG. 8 implies a strong absorption of water by the titanate: the weight loss of step 1 is due to the evaporation of adsorbed water molecules on the particle surface. The weight loss in step 2 can be attributed to the dehydroxylation of the TMS and the formation of the crystalline $TiO_2$. Based on these results, it can be seen that the NaH-TMS and H-TMS can be denoted as layered $Na_xH_{2-x}Ti_2O_5 \cdot H_2O$ (FIG. 5(e)) and $H_2Ti_2O_5 \cdot H_2O$ respectively.

Figure 9:
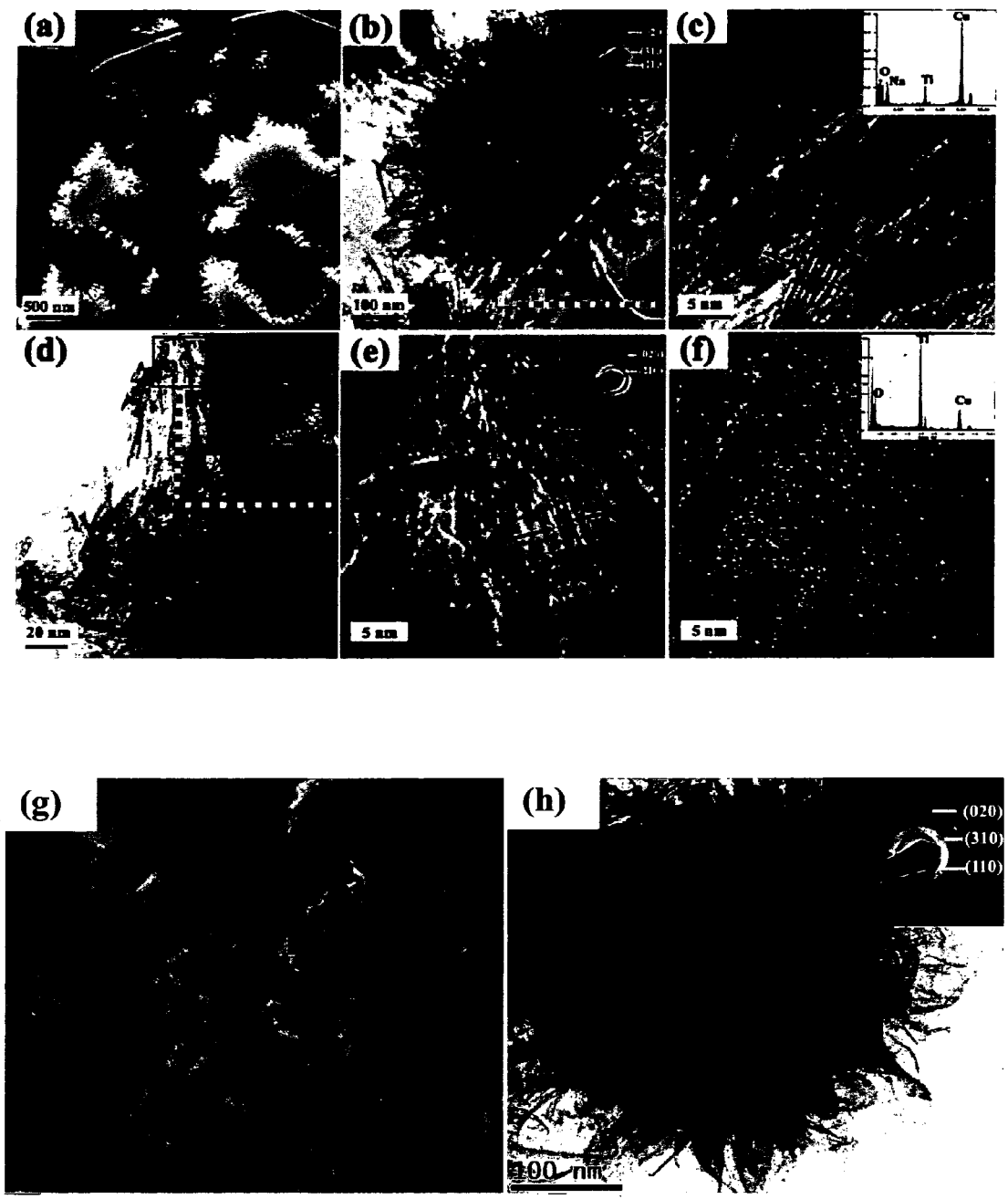
FIG. 9 are TEM images of the fabricated (a) NaH-TMS; (b) individual NaH-TMS anodized under a current density of 0.5 A cm$^{-2}$. The inset shows the corresponding electron diffraction pattern; (c) HRTEM of selected square area in (b). The inset provides the EDS spectra; (d) TEM image of H-TMS nano-flakes. The inset shows the morphology of the H-TMS particles; (e) enlarged view of the selected area in (d). The inset shows the corresponding electron diffraction pattern; (f) the plane view of the H-TMS flakes. The inset displays the EDS spectra; (g) FESEM image of the fabricated Na-TMS (scale bar denotes 1 μm). The inset image (scale bar denotes 100 nm) shows that high density titanate nano-ribbons (TNF) are generated on the surface of individual spherulite; (h) TEM image of single Na-TMS, which shows that the 3D hierarchical structure of nano-ribbons radiating from the core of the TMS.

FIG. 9 shows transmission electron microscopy (TEM) images of the fabricated (a) NaH-TMS; (b) individual NaH-TMS anodized under a current density of 0.5 A $cm^{-2}$. The inset shows the corresponding electron diffraction pattern; (c) HRTEM of selected square area in (b). The inset provides the EDS spectra; (d) TEM image of H-TMS nano-flakes. The inset shows the morphology of the H-TMS particles; (e) enlarged view of the selected area in (d). The inset shows the corresponding electron diffraction pattern; (f) the plane view of the H-TMS flakes. The inset displays the EDS spectra; (g) FESEM image of the fabricated Na-TMS (scale bar denotes 1 μm). The inset image (scale bar denotes 100 nm) shows that high density titanate nano-ribbons (TNF) are generated on the surface of individual spherulite; (h) TEM image of single Na-TMS, which shows that the 3D hierarchical structure of nano-ribbons radiating from the core of the TMS. Morphology of the NaH-TMS (FIGS. 9(a)-(c)) and H-TMS (FIGS. 9(d)-(f)) can be seen. The 3D TMS micro-particle consists of individual 2D titanate flakes at the nanoscale, centered from the core like a star (FIG. 9(b)) forming a hierarchical morphology. The insets of FIG. 9(b) and FIG. 9(e) are the electron diffraction patterns of NaH-TMS and H-TMS spheres respectively. Diffraction rings were observed since the samples were polycrystalline with the nano-flakes radiating outwards. The three diffraction rings are indexed as coming from the three intensive (110), (310), and (020) diffraction planes for the orthorhombic NaH-TMS, while only two sharp diffraction rings corresponding to the (110) and (020) planes of H-TMS were observed. These results are constant with the XRD results (FIG. 5(d)).

Figure 10:
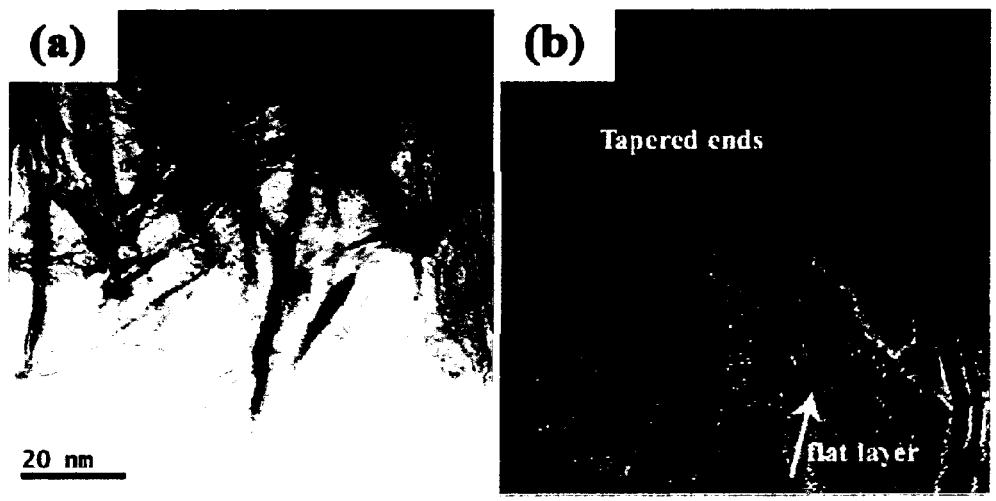
FIG. 10 shows the (a) TEM and (b) HRTEM images of the nano-flakes structure of the H-TMS.

EDS analysis, shown in insets of FIG. 9(c) and FIG. 9(f), suggests that the NaH-TMS and H-TMS are composed of Na/Ti/O and Ti/O individually while the Cu element comes from the copper grid. The FESEM-EDS result in FIG. 6 further verifies the elemental information. Based on the fringes in the high-resolution TEM image of the NaHTMS in FIG. 9(c), the interlayer distance of the layered structure is about 0.74 nm. It is interesting to note that the morphology of HTMS shown in FIG. 9(d) is similar to those of FIG. 9(a) after acid washing. The displayed interlayer distance for H-TMS is lower and close to 0.70 nm (FIG. 9(d)), which is consistent with the literature reports. Moreover, the other two fringes with interlayer distances of 0.22 and 0.35 nm in the nano-flakes were observed in FIG. 9(f). These three values correspond to the spacing of the (200), (501), and (110) planes of a lepidocrocite $Na_xH_{2-x}Ti_2O_5 \cdot H_2O$ respectively. It is noted that the interlayer distance measured from the TEM image is smaller than that obtained from the XRD measurement. This deviation is caused by the dehydration of the samples in ultrahigh vacuum during the TEM observation. FIG. 10 shows (a) TEM and (b) HRTEM images of the nano-flakes structure of the H-TMS. The plane view of nano-flakes shown in FIG. 9(f) and FIG. 10 reveals that the individual flakes consist of tapered ends on the flat plane. Furthermore, as can be seen from FIG. 10(b), the nano-flake is mostly crystalline with the presence of tiny amorphous structures at the ends.

Example 6: Formation Mechanism

Figure 11:
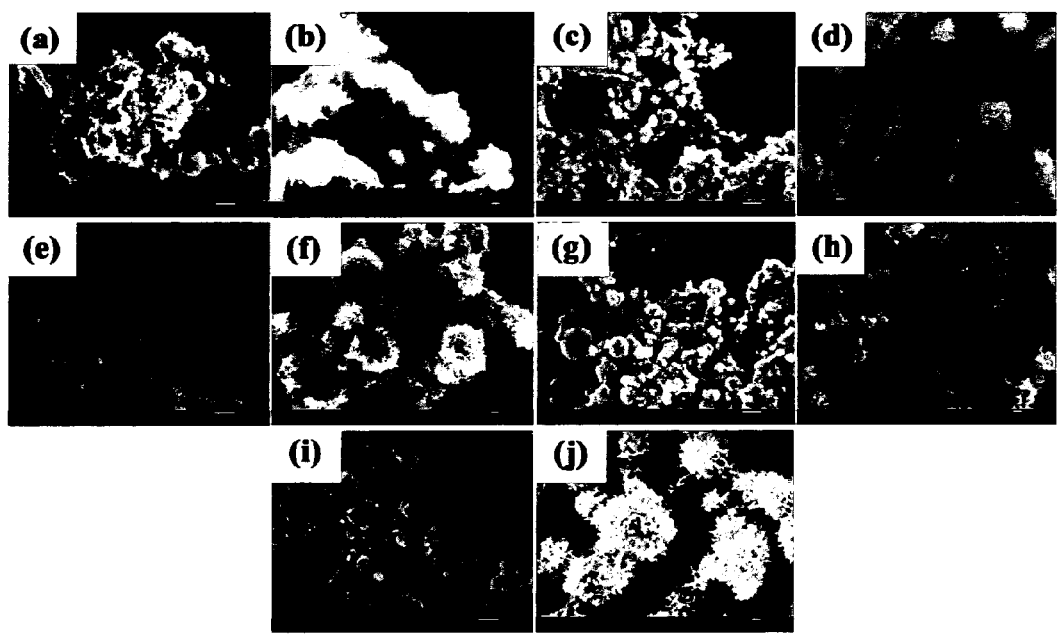
FIG. 11 are FESEM pictures of the morphology change of TMS with processing time. (a, b) 2 min; (c, d) 5 min; (e, f) 10 min; (g, h) 15 min; (i, j) 20 min. The second micrograph in each condition shows high magnification view of the same sample.
Figure 12:
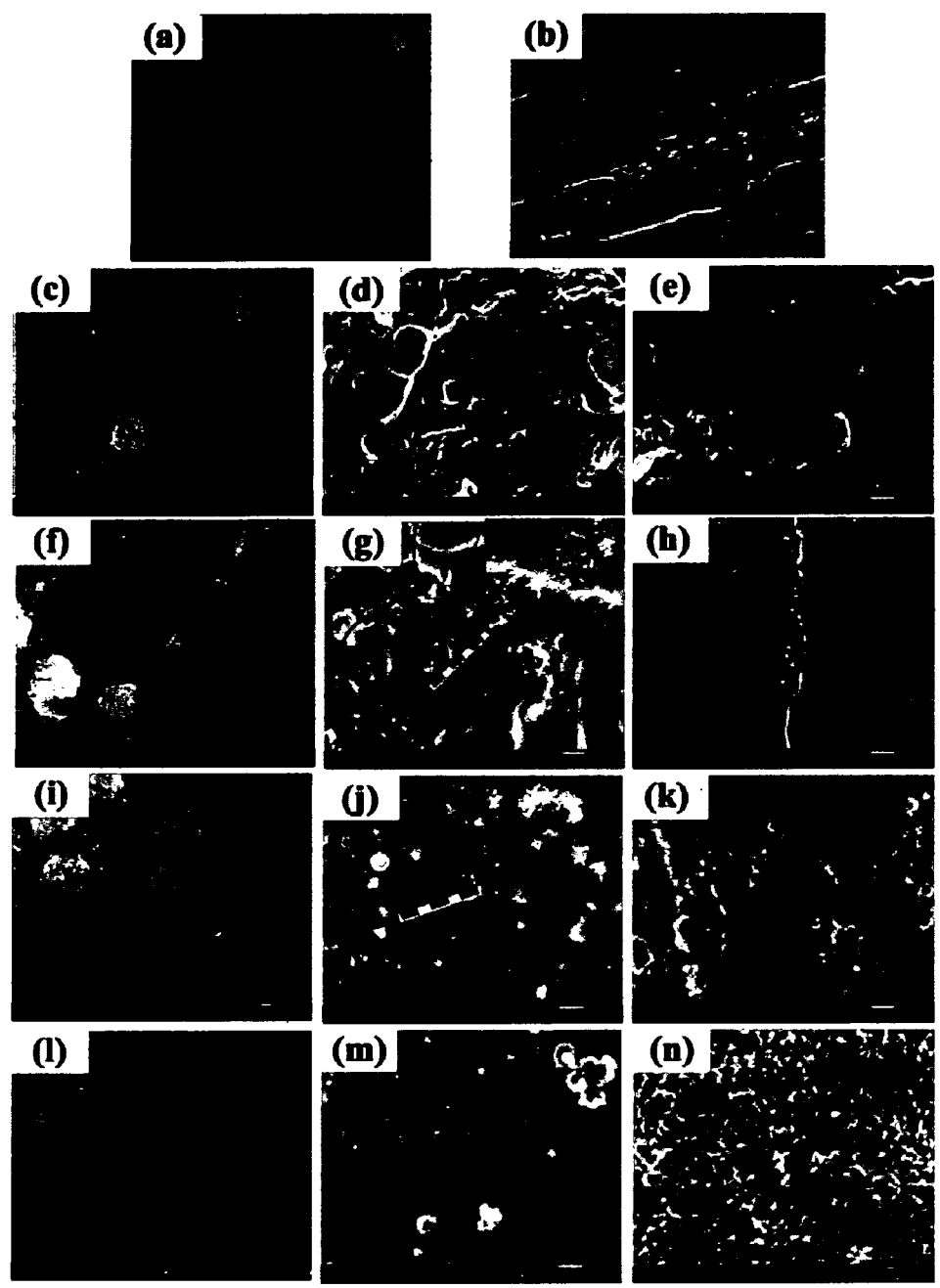
FIG. 12 are FESEM pictures of the morphology change of the nanoporous $TiO_2$ nanosheet on Ti foil (a, b) 0 min; (c, d, e) 2 min; (f, g, h) 5 min; (i, j, k) 10 min; (1, m, n) 20 min under a current density of 0.5 Acm$^{-2}$; The images of (d, e), (g, h), (j, k) are the high magnification micrographs of the selected regions by circle and rectangle in (c), (f), (i) respectively; The inset images of (g) and (j) are the magnification of triangle in image (g) and (j) individually.
Figure 13:
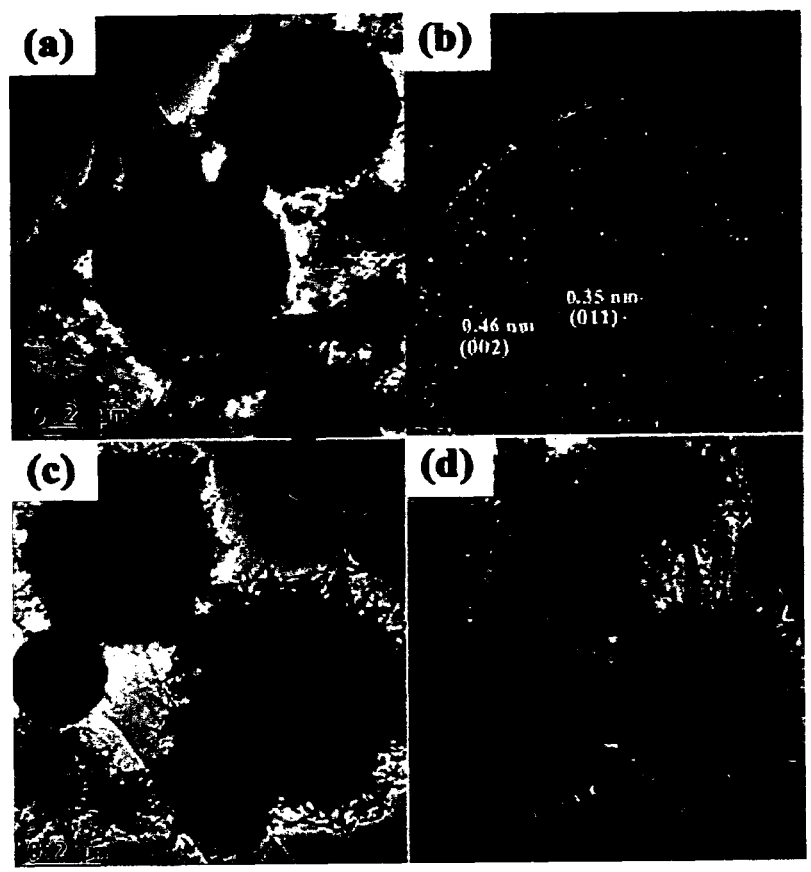
FIG. 13 are TEM images of (a,b), (c), (d) powders samples taken at 2, 10 and 20 min under a current density of 0.5 A cm$^{-2}$ respectively.
Figure 14:
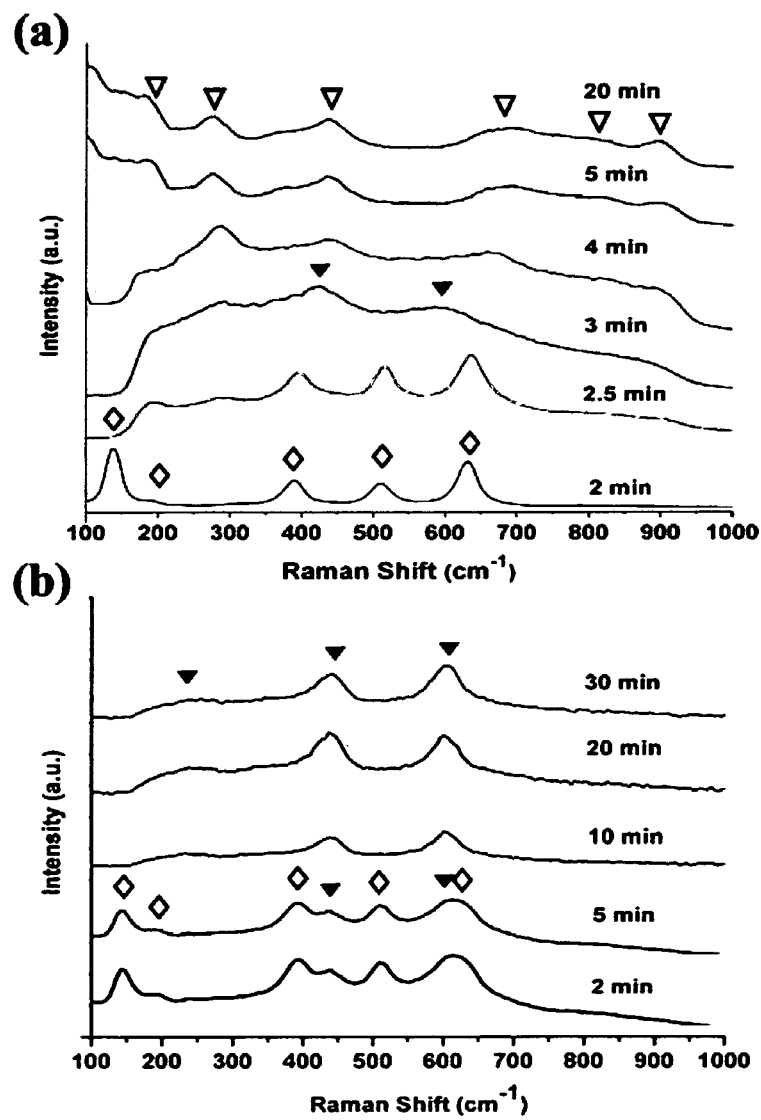
FIG. 14 are Raman spectra of (a) the precipitates collected from the solution after 2, 2.5, 3, 4, 5, 20 min anodization; (b) the $TiO_2$ layer generated on Ti foil after 2, 5, 10, 20, 30 min anodization (◇—anatase; ▼—rutile; ▽—titanate).

To understand the formation process of the TMS, FESEM observation was carried out on both the powders and the Ti foil surface after different anodization times. The morphological evolution processes with time are shown in FIG. 11 and FIG. 12 respectively. FIG. 11 are FESEM pictures of the morphology change of TMS with processing time. (a, b) 2 min; (c, d) 5 min; (e, f) 10 min; (g, h) 15 min; (i, j) 20 min. The second micrograph in each condition shows high magnification view of the same sample. FIG. 12 are FESEM pictures of the morphology change of the nanoporous TiO2 on Ti foil (a, b) 0 min; (c, d, e) 2 min; (f, g, h) 5 min; (i, j, k) 10 min; (l, m, n) 20 min under a current density of 0.5 Acm-2; The images of (d, e), (g, h), (j, k) are the high magnification micrographs of the selected regions by circle and rectangle in (c), (f), (i) respectively; The inset images of (g) and (j) are the magnification of triangle in image (g) and (j) individually. The dependence of anodic voltage and the solution temperature with time at a current density of 0.5 A $cm^{-2}$ was shown in FIG. 3. Additionally, a series of the powder morphology evolution is shown by TEM in FIG. 13. FIG. 13 are TEM images of (a,b), (c), (d) powders samples taken at 2, 10 and 20 min under a current density of 0.5 A $cm^{-2}$ respectively. FIG. 13(b) is a HRTEM image of the selected area in FIG. 13(a). The Raman scattering spectra (FIG. 14) are also provided to understand the crystal structure evolution with processing time.

When the spark discharge starts, the oxide layer is formed at the electrolyte/oxide interface via

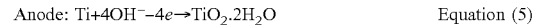

Anode: $Ti + 4OH^- - 4e \rightarrow TiO_2 \cdot 2H_2O$     Equation (5)

Then the layer is electrically broken down and spalled into the solution at relatively high-voltage electrolyzing oxidation process. Simultaneously, a rapid evolution of hydrogen in the form of strong bubbling occurs at the cathode via:

Cathode: $2H^+ + 2e \rightarrow H_2 \uparrow$     Equation (6)

This electrochemical spark discharge spallation (ESDS) process induces the formation of crystalline $TiO_2$ structure, which is triggered by the local exothermic heat caused by the vigorous spark discharge. This is supported by the results of the Raman spectra shown in FIG. 14. The bands located at 144, 198, 398, 515, 640 $cm^{-1}$ of the precipitation collected from the solution belong to Raman ($A_{1g}+2B_{1g}+3E_g$) active modes of the anatase (FIG. 14(a), 2 min), and the two fringes with distances of 0.35 nm and 0.46 nm correspond to the spacing of the (011) and (002) planes of anatase $TiO_2$ are also observed in FIG. 13(b). It was observed that the precipitates possess a microscale spherical core. But on the outer layer of the precipitates, there exists many radiating fine structures with high porosity (FIG. 13(a), FIG. 11(a)-(d)). With time, the crystal structure of the precipitates changes from anatase (FIG. 14(a), 2 min) to mixed anatase/titanate (FIG. 14(a), 2.5 min) and mixed rutile/titanate (FIG. 14(a), 3 min) before complete conversion to titanate. This implies that the spalled particles were initially anatase phase, and then became rutile after about 3 minutes. On the other hand, the surface layer left on the Ti foil consists of anatase and rutile in the initial stage (FIG. 14(b), 2 to 5 min) and changes to rutile only later.

When the electrolyte temperature increases, the hydrothermal reaction of the spalled $TiO_2$ particles begins. The term "hydrothermal-like" may be a more appropriate term to describe the reaction, as the conditions are not exactly the same as that of a hydrothermal reaction, for example, in that a high pressure is not used. The reaction also changes the morphology and crystal structure of the spalled particles. The reaction takes place in solution based on the following reaction:

$$2TiO_2+2NaOH \rightarrow Na_2Ti_2O_5 \cdot H_2O \qquad \text{Equation (7)}$$

In FIG. 14(a), the broad Raman bands located near 188, 280, 389, 447, 705, and 905 $cm^{-1}$ belong to the titanate structure formed after anodization for about 4 to 5 minutes. These bands remain the same with prolonged treatment duration up to 20 minutes. The starting titanate formation temperature in the solution was found to be around 60° C., which agrees with previously reported values. The titania-titanate transformation has resulted in the spherulite type of titanate particles consisting of radiating nano-flakes. For example, the titania micro-spherulite (FIG. 13(a)) formed at 2 minutes has transformed to a porous spherulite structure with nanoflakes at 10 minutes (FIG. 13(c)) due to the hydrothermal-like reaction. As the reaction proceeds (20 minutes), the retrieved particles almost completely consist of nano-flakes (FIG. 13(d)). It was also observed that the average size of precipitates decreases as the reaction proceeds, as shown by the FESEM images of powders collected at different times (FIG. 11). This is likely due to the decrease of the breakdown thickness of the $TiO_2$ layer in the heated solution where the voltage applied to the dielectric layer ($=I.R_{a/e}$) decreases. The applied voltage curve conducted at 0.5 A $cm^{-2}$ decreases to a steady state in FIG. 3(a) largely because of the decrease of the dielectric layer voltage.

A layer of crystalline $TiO_2$ was formed on the Ti foil surface. Its morphology evolved as shown in FIG. 12. As a result of the spark discharge, the dense oxide layer starts to spall and dissolve, and the titanium surface becomes rougher with time. A more detailed examination shows that numerous cracks or pores were formed on the titanium surface (FIG. 12(c)-(e)). As the reaction progresses, the increase in temperature resulted in accelerated anodic dissolving $TiO_2$ films and the formation of nanosheet structures on the Ti surface (FIG. 12(i)-(n)). Since the $TiO_2$ layer is continually broken into the solution due to the spark discharge, the surface layer always consists of the freshly formed $TiO_2$. Thus there is not enough time for the chemical reaction between the $TiO_2$ and the NaOH solution to occur on the surface of the Ti foil. As a result, no titanate phase was found on the Ti surface (FIG. 14(b)). The increase of the discharge temperature on the Ti foil surface has promoted the phase transformation of the anodized $TiO_2$ layer from anatase to rutile. The Raman spectra in FIG. 14(b) shows surface layer consists of the anatase and rutile titania at the beginning (2 to 5 minutes), and then this crystal structure changes completely to rutile titania later (10 to 30 minutes). The crystalline phase of the spalled particles followed the same sequence (FIG. 14(a)). Despite the difference in the starting phase of titania, the same titanate phase forms after reaction with high concentration sodium hydroxide (FIG. 14(a)). The results are in agreement with previous reports that all polymorphs of titania (anatase, rutile, brookite, or amorphous) can be transformed to the titanate under alkaline hydrothermal conditions.

Figure 15:
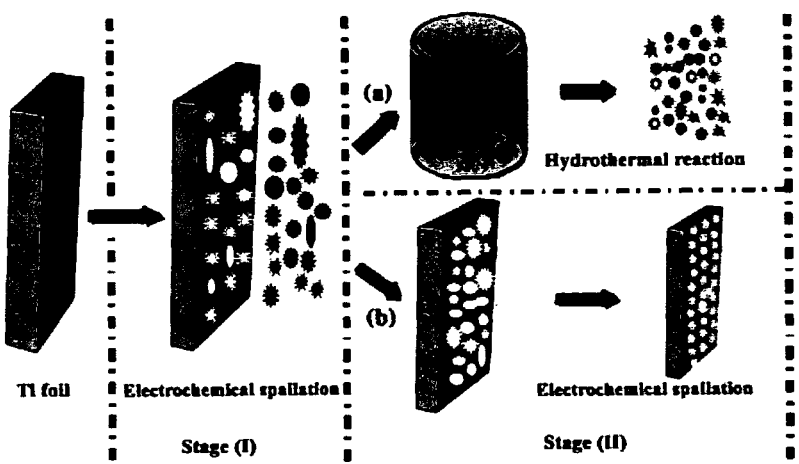
FIG. 15 is a schematic illustration of the formation process for TMS and $TiO_2$ nanosheet structure. Stage I: the formation of $TiO_2$ particle and $TiO_2$ oxide layer by anodization and spallation of Ti foils; Stage II: (a) the formation of TMS in the solution by hydrothermal-like process; (b) the formation of $TiO_2$ porous nanosheet on Ti foil surface.

On the basis of the experimental results, it is postulated that the formation mechanism of the hierarchical titanate microspherulite in the solution and $TiO_2$ nanosheet structure on the Ti foil surface is through a synergistic effect of electrochemical spallation and hydrothermal-like reaction, as illustrated in FIG. 15. In the first stage (I), fast anodic reaction on titanium surface creates a layer of titania that instantly breaks down under the applied electrical field into the solution in the form of anatase titania particles [FIG. 14(a) (2 min), FIG. 11(a),(b)]. From the TEM image (FIG. 13(a)) and SEM image (FIG. 11(a),(b)), it is observed that the titania particles possess porous surface features. This would facilitate rapid reaction with the NaOH solution. At the same time, numerous small micropores (FIG. 12(c)-(e)) are formed on Ti foil surface. In the second stage (II), at a relatively high solution temperature (60° C., 5 min), the porous spalled particles readily react with the heated NaOH electrolyte to form the titanate particles (FIG. 14(a), 5 to 20 min) in stage (II)-(a), and the hierarchical porous structure (FIG. 13(c)) is gradually derived from the titania precipitate (FIG. 13(a)). The formation of TMS is very fast because the spalled particles can be heated up to extremely high temperature by the spark discharge. It has been reported that the spark discharge can cause local temperature to reach several thousand Kelvin (K). Such a condition is unmatched by any existing methods for titanate formation, which typically take much longer time (12-48 h) for the reaction to complete. Using the reflux method, a similar morphology of flower-like titanate particles has been reported. However, the surface area (about 224 $m^2 g^{-1}$) was lower than that obtained by a method of the present invention and the reaction took days to complete. In stage (II)-(b), the micropores in the oxide layer on the Ti surface turns into nanosheet structure (FIG. 12(i)-(n)) as a result of dissolution in the high concentration alkaline solution. This is the first report that crystalline $TiO_2$ nanosheet is formed at a low applied voltage (around 30 V) compared to the reported high voltage micro-arc oxidation (100 to 500 V).

The reported synthesis method is different from all known approaches to form titanate nanostructures. A unique advantage of the current method lies in its high throughput at a simple ambient setup, while most of the reported methods require much longer processing time. The reaction yield of the current method was 0.10 to 0.15 g TMS per $cm^{-2}$ of Ti foil for only 20 minutes processing at a current density of 0.5 A $cm^{-2}$. The production yield can be easily scaled up by increasing the exposed Ti surface area and the current density. The specific surface area of H-TMS clearly exceeds any reported values of hydrogen titanate materials (e.g., nano-tubes, wires, etc.) prepared by hydrothermal method thus far.

Example 7: Evaluation of the Adsorption Properties

Materials with layered crystal structures, such as titanates and niobates, could be used as adsorbents or catalysts for the removal of organic and inorganic pollutants in waste water. Very recently, the 1D-titanate nanofibers and nanotubes showed excellent adsorption of organic molecules and radioactive toxic metal ions. Divalent lead ($Pb^{II}$), one of the metals that have the most damaging effects on human health, can cause damage to the central nervous system and dysfunction to the kidneys and immune system of human beings, especially for children.

As an example of a potential application, the as-obtained micro-scale 3D-TMS was evaluated for adsorption of toxic heavy metal ions $Pb^{II}$ and methylene blue (MB), a common organic dye in the textile industry. For comparison, trititanate micro-particle (TMP) via pyrosynsis, titanate nanowire (TNW) and titanate nanotube (TNT) by a hydrothermal approach were also prepared. All these samples for the adsorption experiments are without acid washing.

Figure 16:
FIG. 16 are TEM images of (a) titanate nanotube (TNT); (b) titanate nanowire (TNW) obtained by hydrothermal treatment of anatase $TiO_2$ powders in 10 M NaOH at 130 and 170° C. for 48 h respectively; (c) $Na_2Ti_3O_7$ micro-particle (TMP) synthesized via a high temperature solid-state route with the mixture of commercial $TiO_2$ anatase and $Na_2CO_3$ at 900° C. for 24 h; (d) FESEM of $Na_2Ti_3O_7$ micro-particle (TMP) in (c); (e) XRD data of $Na_2Ti_3O_7$ micro-particle (TMP) in (c).
Figure 16:
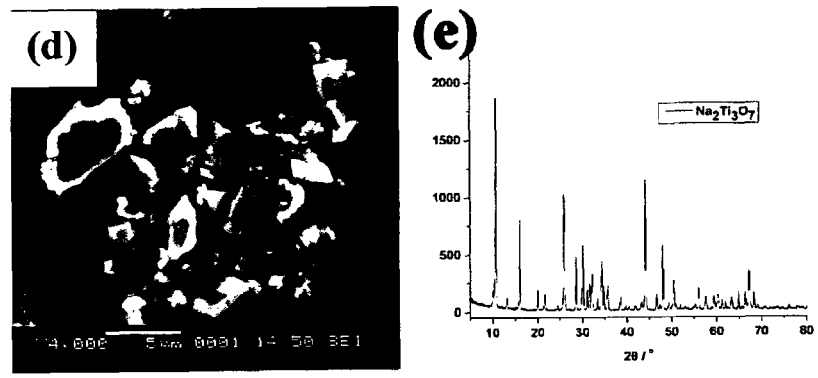

The experimental condition and morphology of the prepared TMP, TNW and TNT are shown in FIG. 16. FIG. 16 are TEM images of (a) titanate nanotube (TNT); (b) titanate nanowire (TNW) obtained by hydrothermal treatment of anatase $TiO_2$ powders in 10 M NaOH at 130 and 170° C. for 48 h respectively; (c) $Na_2Ti_3O_7$ micro-particle (TMP) synthesized via a high temperature solid-state route with the mixture of commercial $TiO_2$ anatase and $Na_2CO_3$ at 900° C. for 24 h; (d) FESEM of $Na_2Ti_3O_7$ micro-particle (TMP) in (c); (e) XRD data of $Na_2Ti_3O_7$ micro-particle (TMP) in (c).

Figure 17:
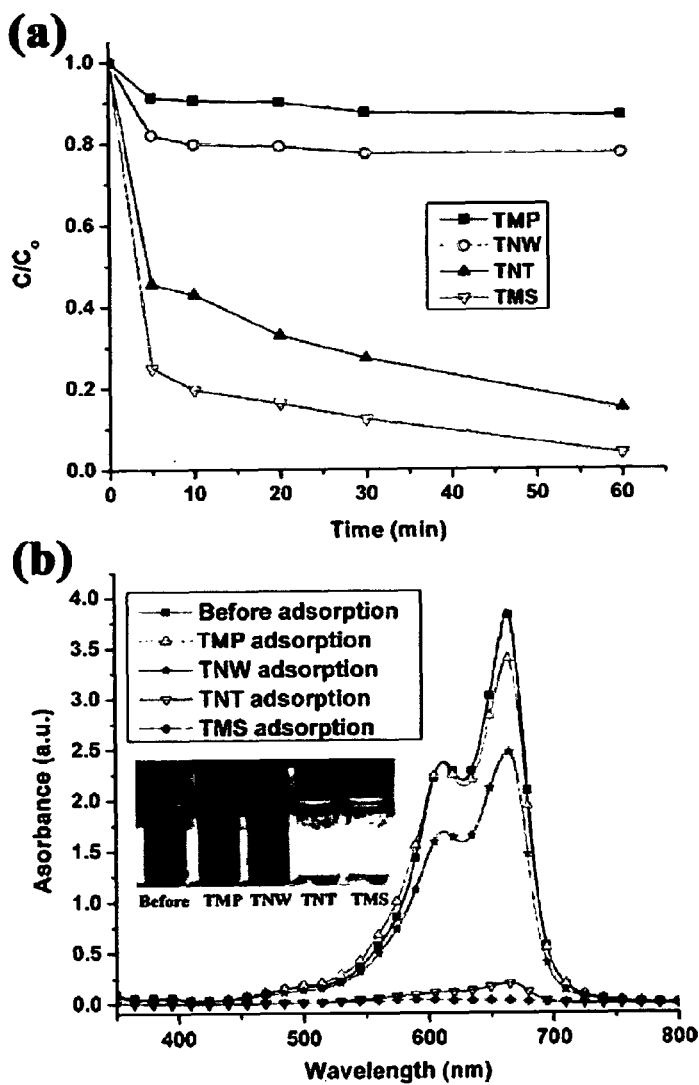
FIG. 17 are graphs showing (a) Adsorption MB (20 ppm, 50 mL) by TMP, TNW, TNT, and TMS. $C_o$ (ppm) is the initial concentration of the MB solution and C (ppm) is the concentration of that at different intervals during the adsorption. (b) Comparison of the absorption spectra of the MB solution (20 ppm, 50 mL) before and after 12 h adsorption and in the presence of TMP, TNW, TNT and TMS. The amount of adsorbent is 10 mg, and photographs showing the solution color are, from left to right, before adsorption, TMP, TNW, TNT and TMS.
Figure 18:
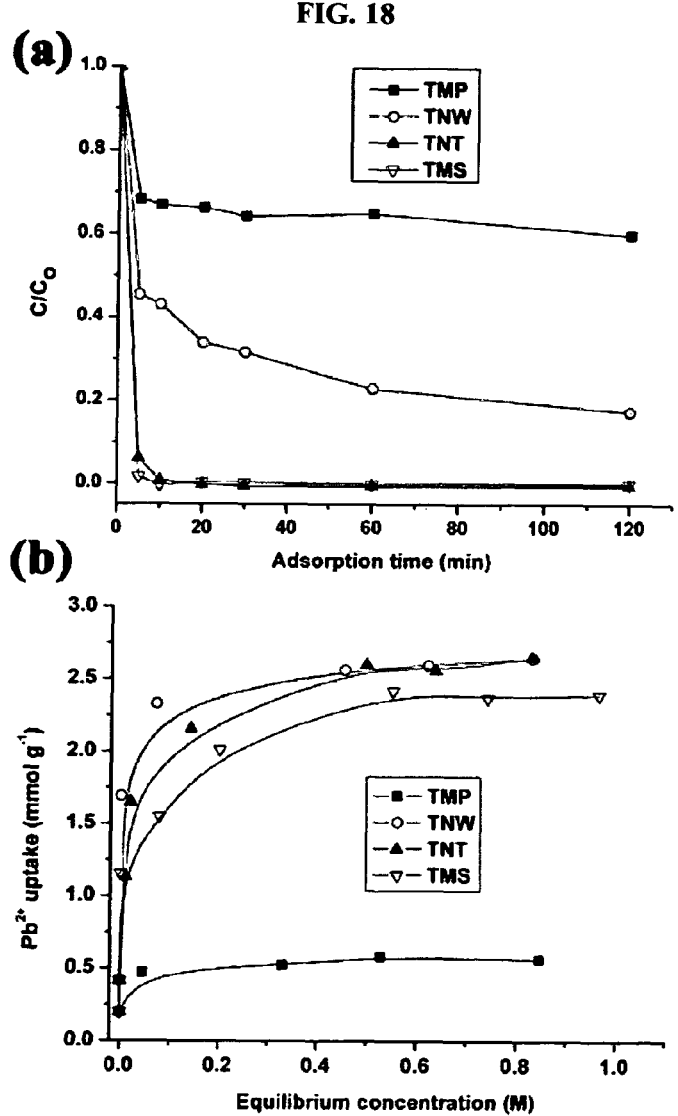
FIG. 18 shows comparison graphs of (a) adsorption rate and (b) adsorption isotherms of $Pb^{II}$ ions by TMP, TNW, TNT and TMS. Co (120.5 mg L$^{-1}$) is the initial $Pb^{II}$ concentration, and C the concentration at different intervals during the test.
Figure 19:
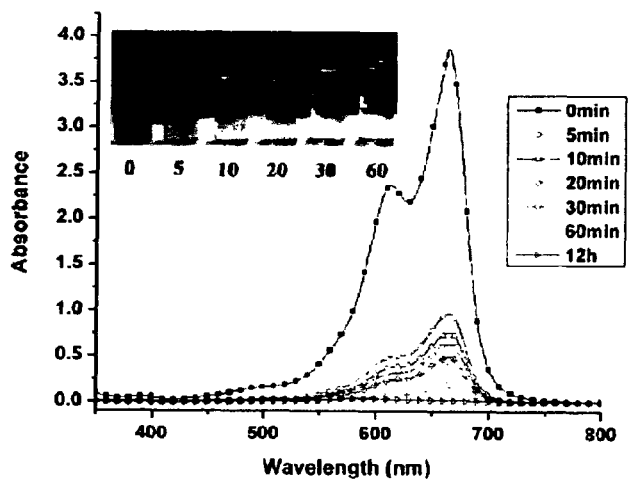
FIG. 19 shows the adsorption spectra of a solution of MB (20 ppm, 50 mL) in the presence of TMS (10 mg) after 0, 5, 10, 20, 30, 60 and 720 min. The inset images show the corresponding color change at these time intervals.

FIG. 17 and FIG. 18 illustrate the absorption performances of different adsorbents for MB and $Pb^{II}$ in aqueous solutions. FIG. 17 are graphs showing (a) Adsorption MB (20 ppm, 50 mL) by TMP, TNW, TNT, and TMS. $C_o$ (ppm) is the initial concentration of the MB solution and C (ppm) is the concentration of that at different intervals during the adsorption. (b) Comparison of the absorption spectra of the MB solution (20 ppm, 50 mL) before and after 12 h adsorption in the presence of TMP, TNW, TNT and TMS. The amount of adsorbent is 10 mg, and photographs showing the solution color are, from left to right, before adsorption, TMP, TNW, TNT and TMS. FIG. 18 shows comparison graphs of (a) adsorption rate and (b) adsorption isotherms of $Pb^{II}$ ions by TMP, TNW, TNT and TMS. Co (120.5 mg $L^{-1}$) is the initial $Pb^{II}$ concentration, and C the concentration at different intervals during the test.

The as-prepared 3D TMS stands as the best with high removal capacity and adsorption rate of MB compared to TNW, TNT and TMP. TMS can remove 75% MB from the solution in 5 min (FIG. 17(a), FIG. 19). After 12 h, it completely removed the MB (FIG. 17(b)). It is estimated that 1.0 g as-prepared TMS can remove about 236.2 mg MB (Table 1 in FIG. 22, FIG. 20) based on experimental saturate sorption capacity. The sorption capacity of TMS is slightly larger than the corresponding capacity for titanate TNT (232.2 mg $g^{-1}$, Table 1 in FIG. 22) and much higher than the ones by the TMP and TNW. The removal capacity was significantly higher than what was reported for a 3D hierarchical titanate spheres. The TMS also shows excellent adsorption performance of $Pb^{II}$ ions (FIG. 18). Similar to the adsorption rate of MB, the adsorption of $Pb^{II}$ onto TMS was the fastest. The TMS was able to remove $Pb^{II}$ from the solution almost completely in less than 10 min, as evidenced by the concentration decrease from 120.5 mg $L^{-1}$ ($C_o$) to less than 0.5 mg $L^{-1}$ at room temperature (FIG. 18(a)). In addition, the as-prepared TMS possesses excellent adsorption capacities of $Pb^{II}$ toxic ion. The plateau saturation capacities based on the isotherm curves in FIG. 18(b) are 0.56 mmol $g^{-1}$ for TMP, 2.41 mmol $g^{-1}$ for TMS, 2.60 mmol $g^{-1}$ for TNT and 2.62 mmol $g^{-1}$ for TNW titanate materials (Table 1 in FIG. 22). The capacity of TMS is greater than TMP and comparable with the 1D nanostructure titanate (TNT, TNW).

Comparing the performance among the four types of titanate in MB and $Pb^{II}$ adsorption, it is postulated that the adsorption mechanisms are different, thereby resulting in the difference in the observed removal capacity. MB is cationic dye; the electrostatic force between the adsorbent and the MB ions plays an important role in its adsorption capacity. To verify this, Zeta potential measurement of the TNT in different pH values was performed (FIG. 21(a)) and their corresponding adsorptions of an initial concentration of 20 ppm MB solution are shown in FIG. 21(b). The highest MB dye removal occurs at pH 9.5 to 10 when the titanate surface is most negatively charged. Varying the solution pH affects the adsorption; there was very little MB adsorption when pH=1 (FIG. 21(b)). Therefore, all the other adsorption performance of titanate materials was performed at pH 9.5 to 10. The data in Table 1 of FIG. 22 suggest that the adsorption capacity increases with increasing surface area. It was suggested that MB molecules might be trapped into the interlayer space of the titanate by exchanging with cation ions. However, since MB is a larger molecule, it is not expected that such an exchange would only occur at sites near the particle surfaces. In other words, the MB adsorption capacity is highly sensitive to the surface area. Therefore TMS sample with the hierarchical porous structure as described earlier gives rise to the highest MB adsorption rate and capacity (FIG. 17 and Table 1 in FIG. 22).

The $Pb^{II}$ adsorption by the titanates is through ion-exchange which was evidenced by XRD and Raman measurements, i.e. the $Pb^{II}$ cations replace the protons or Na via the following reaction:

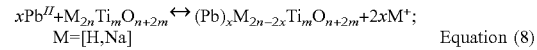

$$xPb^{II}+M_{2n}Ti_mO_{n+2m} \leftrightarrow (Pb)_xM_{2n-2x}Ti_mO_{n+2m}+2xM^+;$$
$$M=[H,Na] \qquad \text{Equation (8)}$$

The cation exchange capacity (CEC=$mol_{Na,H}/M_{w(titanate)}$) of titanate material is mainly depended on the exchangeable sites in the adsorbent. It was found that the exchange capacities of TMS, TNW and TMP are high and comparable, but the one for the TMP is much lower (Table 1 of FIG. 22). The poor adsorption performance of TMP is due to its large particle size which effectively hinders the cation diffusion during the exchange process. As shown in FIG. 16, the particle size of the TMP is around 1 to 2 mm. In comparison, the TMS sample also has large particle size, but its hierarchical porous structure facilitates the exchange reaction extending to large number of exchangeable sites.

In addition to the morphological reason, the crystal structure may also play an role in the adsorption performance. The TMP ($Na_2Ti_3O_7$) synthesized by high temperature solid state reaction has a different crystal structure with the one by low temperature solution process. The former has a theoretical cation exchange capacity 6.62 mmol $g^{-1}$, which is lower than the one for TMS ($Na_{2-x}H_xTi_2O_5$, 9.05 mmol $g^{-1}$). Therefore, the surface area and the crystal structure are the main factors that give rise to the excellent adsorption rate and capacity of the TMS particles.

Compared with the titanate TMP, TNW and TNT, the TMS has the fastest adsorption rate which is clearly related to its high surface area. Therefore, it is the most efficient adsorbent in terms of sorption kinetics for removal of the MB organic dye and $Pb^{II}$ heavy metal ions from contaminated water. In addition, as the size of the TMS sample is of the order of micrometers, the particles will not easily agglomerate. The recovery of the used particles will be much easier than nanoparticles. From a practical application point of view, the synthesized TMS according to the present invention also enjoys a clear advantage in terms of production and operation cost. A wide range of applications for this type of materials in photo catalysis and energy storage where excellent functionality and large surface area are essential is expected.

The invention claimed is:

1. A method of manufacturing layered metal oxide particles, the method comprising:
   placing a metal electrode in an electrolyte;
   applying an electrical voltage to the metal electrode, wherein the metal electrode forms an anode, and the applying forms a metal oxide layer on a surface of the metal electrode, and wherein the applied electrical voltage is higher than a breakdown voltage of the metal oxide and breaks down the metal oxide layer formed on the metal electrode surface into metal oxide particles; and
   reacting the metal oxide particles with the electrolyte to form the layered metal oxide particles.

2. The method according to claim 1, wherein the electrical voltage applied to the metal electrode is between about 25 V to 100 V.

3. The method according to claim 2, wherein the electrical voltage applied to the metal electrode is between about 25 V to 50 V.

4. The method according to claim 1, wherein the electrical voltage applied to the metal electrode generates a current density of between about 0.1 A cm$^{-2}$ to 10 A cm$^{-2}$.

5. The method according to claim 1, wherein the method is carried out at a solution temperature of between about 10° C. to about 200° C.

6. The method according to claim 1, wherein the method is carried out at a pressure of about 1 bar to about 150 bar.

7. The method according to claim 1, wherein the electrolyte is capable of reacting with the metal oxide to form a different material having a layered crystal structure.

8. The method according to claim 7, wherein the electrolyte is an aqueous solution of an alkali metal salt.

9. The method according to claim 8, wherein the alkali metal salt is selected from the group consisting of sodium hydroxide, potassium hydroxide, lithium hydroxide, caesium hydroxide, rubidium hydroxide and mixtures thereof.

10. The method according to claim 1, wherein the metal of the metal oxide is one selected from the group consisting of titanium, zirconium, hafnium, vanadium, niobium, tantalum, manganese and alloys thereof.

11. The method according to claim 10, wherein the metal of the metal oxide is titanium.

12. The method according to claim 11, wherein the metal oxide particles comprise $TiO_2$.

13. The method according to claim 12, wherein the layered metal oxide particles comprise titanate.

14. The method according to claim 13, wherein the layered metal oxide particles consist of $TiO_2$ with a layer of titanate formed thereon.

15. The method according to claim 1, wherein the maximal dimension of the layered metal oxide particles is between about 0.1 μm to 10 μm.

16. The method according to claim 1, wherein the layered metal oxide particles comprise pores having an average pore size of between about 2 nm to about 500 nm.

17. The method according to claim 1, wherein the layered metal oxide particles have a BET surface area of between about 10 m$^2$ g$^{-1}$ to about 500 m$^2$ g$^{-1}$.

18. The method according to claim 1, wherein the layered metal oxide particles comprise at least one layer of a different material.

19. The method according to claim 18, wherein an interlayer distance is between about 0.5 nm to about 5 nm.

20. A method of manufacturing a crystalline metal oxide nanosheet or a crystalline metal oxide nanoribbon, the method comprising:
   placing a metal electrode in an electrolyte;
   applying an electrical voltage and/or current to the metal electrode, wherein the metal electrode forms an anode, and the applying forms a metal oxide layer on a surface of the metal electrode, and wherein the applied electrical voltage and/or current is high enough to break down the metal oxide layer formed on the electrode surface into metal oxide particles; and
   reacting the metal oxide particles with the electrolyte to form a crystalline metal oxide nanosheet or a crystalline metal oxide nanoribbon on the metal electrode.

* * * * *